(12) United States Patent
Prakash et al.

(10) Patent No.: US 12,163,877 B2
(45) Date of Patent: Dec. 10, 2024

(54) CAPACITANCE SENSING INSTRUMENTS AND METHODS FOR USE

(71) Applicant: The Boeing Company, Chicago, IL (US)

(72) Inventors: Om Prakash, Bengaluru (IN); Megha Sahu, Bengaluru (IN); Kanakasabapathi Subramanian, Chennai (IN); Venkatrao Chunchu, Chennai (IN); Radhakrishnan Anbarasan, Chennai (IN)

(73) Assignee: THE BOEING COMPANY, Arlington, VA (US)

( * ) Notice: Subject to any disclaimer, the term of this patent is extended or adjusted under 35 U.S.C. 154(b) by 489 days.

(21) Appl. No.: 17/511,152

(22) Filed: Oct. 26, 2021

(65) Prior Publication Data
US 2022/0234762 A1    Jul. 28, 2022

Related U.S. Application Data

(60) Provisional application No. 63/142,739, filed on Jan. 28, 2021.

(51) Int. Cl.
*G01N 17/00* (2006.01)
*G01N 27/22* (2006.01)
(Continued)

(52) U.S. Cl.
CPC .......... *G01N 17/006* (2013.01); *G01N 27/22* (2013.01); *G01N 27/24* (2013.01); *B64F 5/60* (2017.01)

(58) Field of Classification Search
CPC ...... G01N 17/006; G01N 27/22; G01N 27/24; G01N 27/226; G01R 27/2605
See application file for complete search history.

(56) References Cited

U.S. PATENT DOCUMENTS

| 3,337,796 A | 8/1967 | Hentschel et al. |
|---|---|---|
| 4,336,483 A | 6/1982 | Smith |
| (Continued) | | |

FOREIGN PATENT DOCUMENTS

| CN | 202093903 U | 12/2011 |
|---|---|---|
| EP | 2520917 A1 | 11/2012 |

OTHER PUBLICATIONS

Bardal, E. et al., "Corrosion Detection and Diagnosis," Materials Science and Engineering—vol. III, EOLSS, (2009) pp. 144-164.
(Continued)

*Primary Examiner* — Steven L Yeninas
(74) *Attorney, Agent, or Firm* — MH2 TECHNOLOGY LAW GROUP LLP

(57) ABSTRACT

A sensing instrument includes a first electrode, a second electrode that surrounds the first electrode, and a sensing module configured to sense a capacitance of a material by applying a voltage between the first electrode and the second electrode while the first electrode and the second electrode are adjacent to the material. A method of operating a sensing instrument includes applying a voltage between a first electrode and a second electrode while the first electrode and the second electrode are positioned adjacent to a material. The second electrode surrounds the first electrode. The method further includes sensing a capacitance of the material based on a response of the material to the voltage.

20 Claims, 20 Drawing Sheets

(51) Int. Cl.
*G01N 27/24* (2006.01)
*B64F 5/60* (2017.01)

(56) References Cited

U.S. PATENT DOCUMENTS

| | | | | |
|---|---|---|---|---|
| 4,845,421 | A * | 7/1989 | Howarth | G01N 27/223 |
| | | | | 324/683 |
| 5,225,959 | A | 7/1993 | Stearns | |
| 5,459,406 | A * | 10/1995 | Louge | G01N 27/226 |
| | | | | 324/688 |
| 5,539,670 | A * | 7/1996 | Maltby | G01F 23/802 |
| | | | | 702/170 |
| 5,900,736 | A * | 5/1999 | Sovik | G01N 9/24 |
| | | | | 324/687 |
| 6,414,497 | B1 * | 7/2002 | Sovik | G01N 27/02 |
| | | | | 324/687 |
| 6,495,833 | B1 | 12/2002 | Alfano et al. | |
| 6,674,292 | B2 | 1/2004 | Bray et al. | |
| 6,803,771 | B2 * | 10/2004 | Sovik | G01N 9/00 |
| | | | | 324/654 |
| 7,119,338 | B2 | 10/2006 | Thompson et al. | |
| 7,219,024 | B2 * | 5/2007 | Gamache | G01N 27/028 |
| | | | | 702/182 |
| 8,344,739 | B2 | 1/2013 | Van Gastel et al. | |
| 10,165,215 | B2 | 12/2018 | Numata | |
| 2002/0163333 | A1 * | 11/2002 | Schlicker | G01N 27/902 |
| | | | | 324/242 |
| 2005/0179445 | A1 | 8/2005 | Nakano et al. | |
| 2012/0013354 | A1 * | 1/2012 | Bowler | G01N 27/226 |
| | | | | 324/686 |

OTHER PUBLICATIONS

Hu, X. et al., "Planar capacitive sensors—designs and applications," (2010) Sensor Review, vol. 30 No. 1, pp. 24-39.

Hughes, D. et al., "Microwave Nondestructive Detection of Corrosion Under Thin Paint and Primer in Aluminum Panels," Subsurface Sensing Technologies and Applications, vol. 2, No. 4, Oct. 2001, pp. 435-451.

Li, Z. et al., "Further Investigations into the Capacitive Imaging Technique Using a Multi-Electrode Sensor," Appl. Sci. 2018, 8, 2296.

* cited by examiner

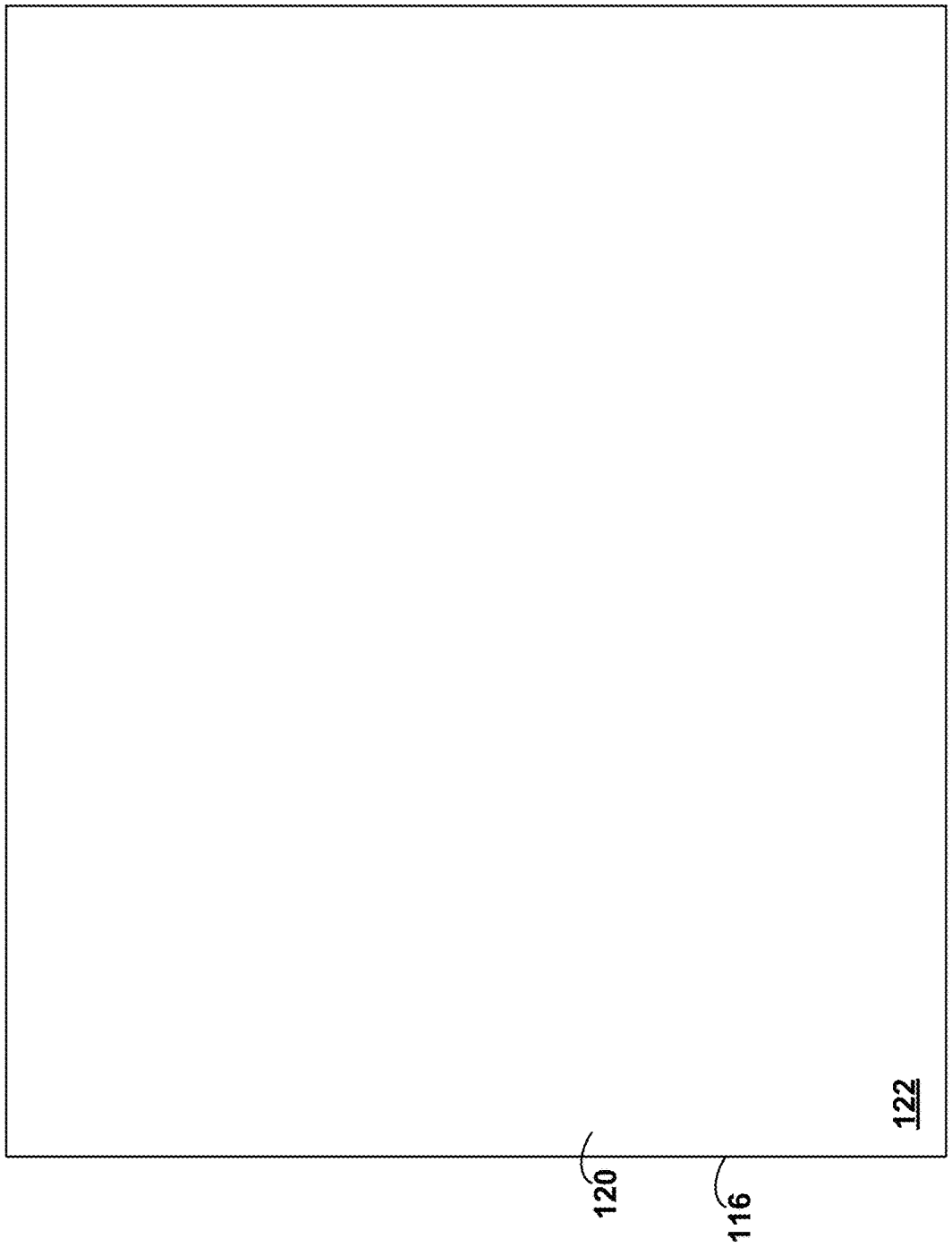

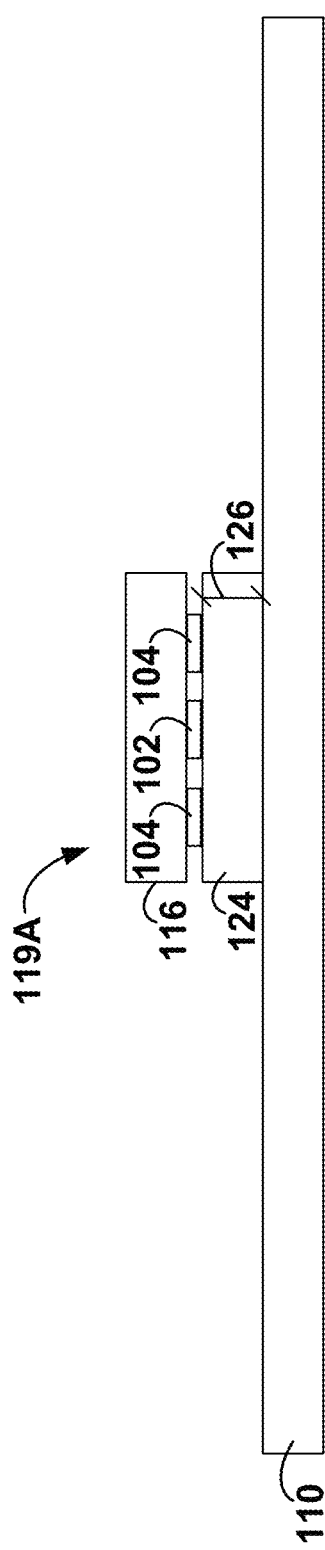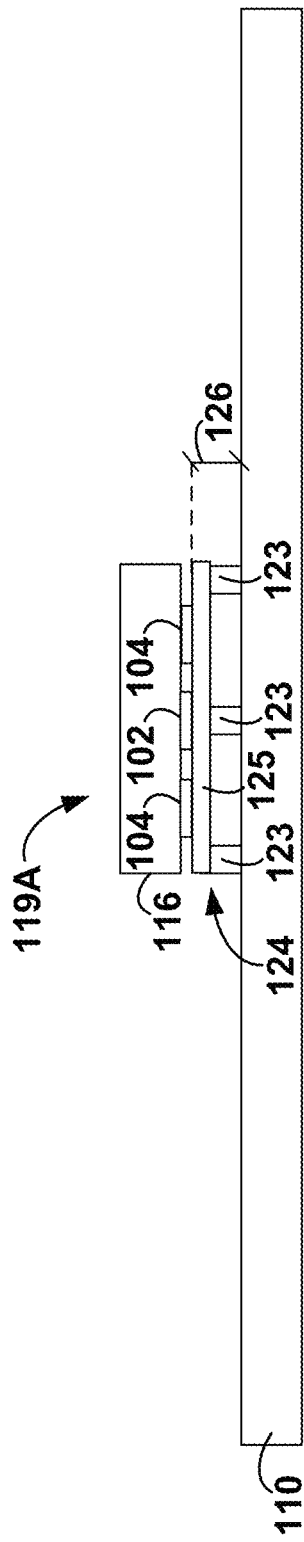

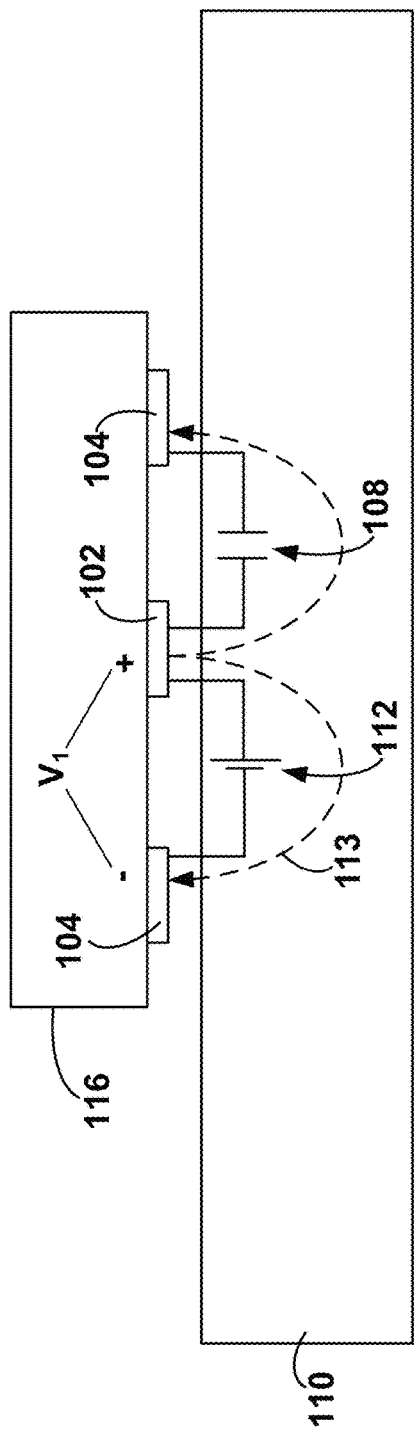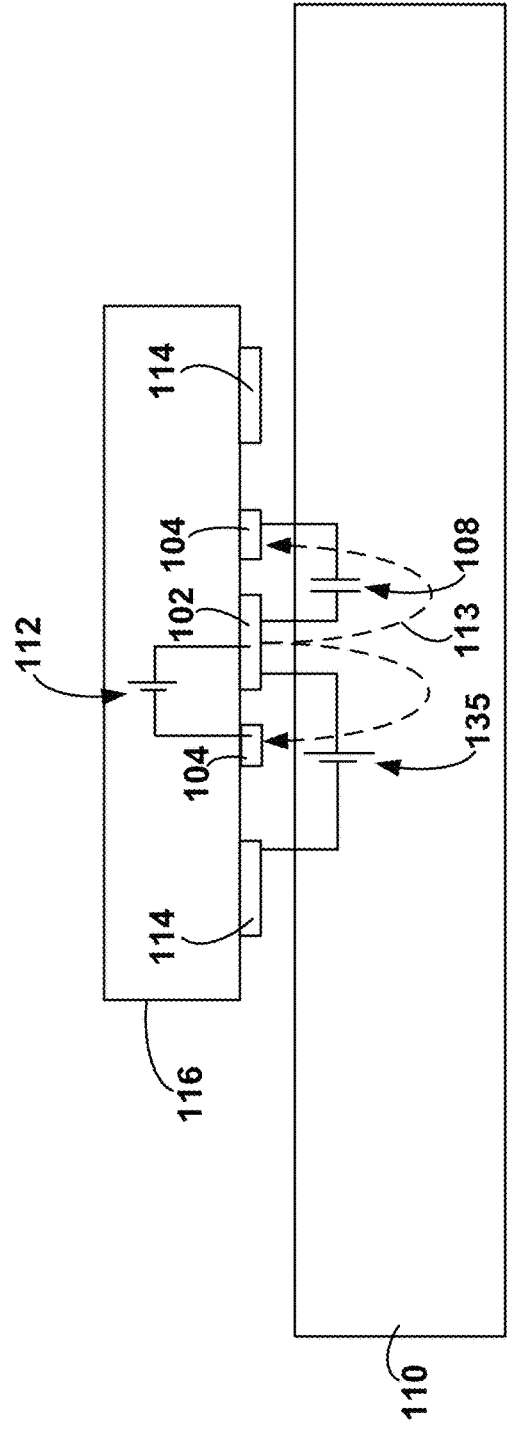

FIG. 10

APPLYING A VOLTAGE BETWEEN A FIRST ELECTRODE AND A SECOND ELECTRODE WHILE THE FIRST ELECTRODE AND THE SECOND ELECTRODE ARE POSITIONED ADJACENT TO A MATERIAL, WHEREIN THE SECOND ELECTRODE SURROUNDS THE FIRST ELECTRODE

202

SENSING A CAPACITANCE OF THE MATERIAL BASED ON A RESPONSE OF THE MATERIAL TO THE VOLTAGE

APPLYING A SECOND VOLTAGE BETWEEN THE FIRST ELECTRODE AND A THIRD ELECTRODE CONCURRENTLY WITH APPLYING THE FIRST VOLTAGE, WHEREIN THE SECOND VOLTAGE IS APPLIED WHILE THE THIRD ELECTRODE IS POSITIONED ADJACENT TO THE MATERIAL, AND WHEREIN THE THIRD ELECTRODE SURROUNDS THE SECOND ELECTRODE

```
┌─────────────────────────────────────────────────────┐
│ DETERMINING THAT THE CAPACITANCE OF THE MATERIAL    │
│ DIFFERS FROM A BASELINE CAPACITANCE BY MORE THAN A  │
│              THRESHOLD DIFFERENCE                    │
└─────────────────────────────────────────────────────┘
              208↙                    │
                                      ▼
┌─────────────────────────────────────────────────────┐
│ RESPONSIVE TO THE DETERMINING, PROVIDING AN INDICATION│
│ VIA A USER INTERFACE THAT AN ABNORMALITY EXISTS BENEATH│
│   THE FIRST ELECTRODE AND THE SECOND ELECTRODE       │
└─────────────────────────────────────────────────────┘
     210↙                                    ↖ 203

FIG. 21
```

```
┌─────────────────────────────────────────────────────┐
│ SENSING THE CAPACITANCE OF THE MATERIAL WHILE MOVING│
│ THE FIRST ELECTRODE AND THE SECOND ELECTRODE OVER THE│
│  MATERIAL TO BE ADJACENT TO A SECOND REGION OF THE  │
│                     MATERIAL                         │
└─────────────────────────────────────────────────────┘
         212↙                         │
                                      ▼
┌─────────────────────────────────────────────────────┐
│ LOW-PASS FILTERING THE CAPACITANCE SENSED WHILE MOVING│
│   THE FIRST ELECTRODE AND THE SECOND ELECTRODE      │
└─────────────────────────────────────────────────────┘
     214↙                                    ↖ 205

FIG. 22
```

302 — APPLYING A FIRST VOLTAGE BETWEEN A FIRST ELECTRODE AND A SECOND ELECTRODE WHILE THE FIRST ELECTRODE AND THE SECOND ELECTRODE ARE POSITIONED ADJACENT TO A FIRST REGION OF A MATERIAL, WHEREIN THE SECOND ELECTRODE SURROUNDS THE FIRST ELECTRODE

304 — SENSING A FIRST CAPACITANCE OF THE MATERIAL BASED ON A FIRST RESPONSE OF THE MATERIAL TO THE FIRST VOLTAGE

306 — APPLYING SECOND VOLTAGE BETWEEN A THIRD ELECTRODE AND A FOURTH ELECTRODE WHILE THE THIRD ELECTRODE AND THE FOURTH ELECTRODE ARE POSITIONED ADJACENT TO A SECOND REGION OF THE MATERIAL, WHEREIN THE FOURTH ELECTRODE SURROUNDS THE THIRD ELECTRODE

308 — SENSING SECOND CAPACITANCE OF THE MATERIAL BASED ON A SECOND RESPONSE OF THE MATERIAL TO THE SECOND VOLTAGE

310 — APPLYING A THIRD VOLTAGE BETWEEN A FIFTH ELECTRODE AND A SIXTH ELECTRODE WHILE THE FIFTH ELECTRODE AND THE SIXTH ELECTRODE ARE POSITIONED ADJACENT TO A THIRD REGION OF THE MATERIAL, WHEREIN THE SIXTH ELECTRODE SURROUNDS THE FIFTH ELECTRODE

312 — SENSING A THIRD CAPACITANCE OF THE MATERIAL BASED ON A THIRD RESPONSE OF THE MATERIAL TO THE THIRD VOLTAGE

FIG. 23 — 300

```
┌─────────────────────────────────────────────────────────┐
│  DETERMINING THAT THE FIRST CAPACITANCE OF THE MATERIAL │
│   DIFFERS FROM A BASELINE CAPACITANCE BY MORE THAN A    │
│                   THRESHOLD DIFFERENCE                  │
└─────────────────────────────────────────────────────────┘
                            │
         314 ┘              ▼
┌─────────────────────────────────────────────────────────┐
│  RESPONSIVE TO THE DETERMINING, DETERMINING A DEPTH OF  │
│  AN ABNORMALITY BENEATH THE FIRST ELECTRODE AND THE     │
│  SECOND ELECTRODE BASED ON THE FIRST CAPACITANCE, THE   │
│     SECOND CAPACITANCE, AND THE THIRD CAPACITANCE       │
└─────────────────────────────────────────────────────────┘
                            │
         316 ┘              ▼
┌─────────────────────────────────────────────────────────┐
│ PROVIDING AN INDICATION VIA A USER INTERFACE OF THE DEPTH│
│ OF THE ABNORMALITY BENEATH THE FIRST ELECTRODE AND THE  │
│                    SECOND ELECTRODE                     │
└─────────────────────────────────────────────────────────┘
         318 ┘
                                              ↖ 301
```

FIG. 24

```
┌─────────────────────────────────────────────────────────┐
│ DETERMINING THAT THE FIRST CAPACITANCE OF THE MATERIAL  │
│ DIFFERS FROM A BASELINE CAPACITANCE BY MORE THAN A      │
│              THRESHOLD DIFFERENCE                        │
└─────────────────────────────────────────────────────────┘
       320 ──┘            │
                          ▼
┌─────────────────────────────────────────────────────────┐
│ RESPONSIVE TO THE DETERMINING, DETERMINING A SIZE OF AN │
│   ABNORMALITY BENEATH THE FIRST ELECTRODE AND THE       │
│ SECOND ELECTRODE BASED ON THE FIRST CAPACITANCE, THE    │
│   SECOND CAPACITANCE, AND THE THIRD CAPACITANCE         │
└─────────────────────────────────────────────────────────┘
       322 ──┘            │
                          ▼
┌─────────────────────────────────────────────────────────┐
│ PROVIDING AN INDICATION VIA A USER INTERFACE OF THE SIZE│
│ OF THE ABNORMALITY BENEATH THE FIRST ELECTRODE AND THE  │
│                   SECOND ELECTRODE                       │
└─────────────────────────────────────────────────────────┘
       324 ──┘
                                              ↖ 303
```

FIG. 25

```
┌─────────────────────────────────────────────────────────┐
│ APPLYING A FOURTH VOLTAGE BETWEEN THE FIRST ELECTRODE   │
│ AND THE SECOND ELECTRODE WHILE THE FIRST ELECTRODE      │
│ AND THE SECOND ELECTRODE ARE POSITIONED ADJACENT TO A   │
│ FOURTH REGION OF THE MATERIAL                           │
└─────────────────────────────────────────────────────────┘
 326 ↓

┌─────────────────────────────────────────────────────────┐
│ SENSING A FOURTH CAPACITANCE OF THE MATERIAL BASED ON   │
│ A FOURTH RESPONSE OF THE MATERIAL TO THE FOURTH         │
│ VOLTAGE                                                 │
└─────────────────────────────────────────────────────────┘
 328 ↓

┌─────────────────────────────────────────────────────────┐
│ APPLYING A FIFTH VOLTAGE BETWEEN THE THIRD ELECTRODE    │
│ AND THE FOURTH ELECTRODE WHILE THE THIRD ELECTRODE      │
│ AND THE FOURTH ELECTRODE ARE POSITIONED ADJACENT TO A   │
│ FIFTH REGION OF THE MATERIAL                            │
└─────────────────────────────────────────────────────────┘
 330 ↓

┌─────────────────────────────────────────────────────────┐
│ SENSING A FIFTH CAPACITANCE OF THE MATERIAL BASED ON A  │
│ FIFTH RESPONSE OF THE MATERIAL TO THE FIFTH VOLTAGE     │
└─────────────────────────────────────────────────────────┘
 332 ↓

┌─────────────────────────────────────────────────────────┐
│ APPLYING A SIXTH VOLTAGE BETWEEN THE FIFTH ELECTRODE    │
│ AND THE SIXTH ELECTRODE WHILE THE FIFTH ELECTRODE AND   │
│ THE SIXTH ELECTRODE ARE POSITIONED ADJACENT TO A SIXTH  │
│ REGION OF THE MATERIAL                                  │
└─────────────────────────────────────────────────────────┘
 334 ↓

┌─────────────────────────────────────────────────────────┐
│ SENSING A SIXTH CAPACITANCE OF THE MATERIAL BASED ON A  │
│ SIXTH RESPONSE OF THE MATERIAL TO THE SIXTH VOLTAGE     │
└─────────────────────────────────────────────────────────┘
 336                                                   ↖ 305
```

FIG. 26

CAPACITANCE SENSING INSTRUMENTS AND METHODS FOR USE

CROSS REFERENCE TO RELATED APPLICATION

The present application is a non-provisional patent application claiming priority to U.S. Provisional Application No. 63/142,739, filed on Jan. 28, 2021, the contents of which are hereby incorporated by reference.

FIELD

The present disclosure generally relates to sensing instruments and methods for using them, and more specifically to sensing instruments and methods for sensing a capacitance of a material.

BACKGROUND

Some aircraft include structural components that are made of aluminum and/or alloys that contain aluminum. Many of these structural components are regularly exposed to ambient environmental conditions such as wind and rain. As such, these structural components tend to exhibit corrosion as time passes, especially at areas like rivet joints. Often, the outer surfaces of these structural components are covered by a layer of paint and/or one or more passivation layers, which can make detection of the corrosion difficult. For example, paint and/or passivation layers can be removed abrasively or via other means, and the corrosion can be detected by visual inspection. However, this is a time-consuming and labor intensive process. As such, a need exists for instruments and methods that facilitate less invasive and quicker detection of corrosion in structural components.

SUMMARY

One aspect of the disclosure is a sensing instrument comprising: a first electrode, a second electrode that surrounds the first electrode, and a sensing module configured to sense a capacitance of a material by applying a voltage between the first electrode and the second electrode while the first electrode and the second electrode are adjacent to the material.

Another aspect of the disclosure is a method of operating a sensing instrument, the method comprising: applying a voltage between a first electrode and a second electrode while the first electrode and the second electrode are positioned adjacent to a material, wherein the second electrode surrounds the first electrode, and sensing a capacitance of the material based on a response of the material to the voltage.

Yet another aspect of the disclosure is a method of operating a sensing instrument, the method comprising: applying a first voltage between a first electrode and a second electrode while the first electrode and the second electrode are positioned adjacent to a first region of a material, wherein the second electrode surrounds the first electrode, sensing a first capacitance of the material based on a first response of the material to the first voltage, applying a second voltage between a third electrode and a fourth electrode while the third electrode and the fourth electrode are positioned adjacent to a second region of the material, wherein the fourth electrode surrounds the third electrode, sensing a second capacitance of the material based on a second response of the material to the second voltage, applying a third voltage between a fifth electrode and a sixth electrode while the fifth electrode and the sixth electrode are positioned adjacent to a third region of the material, wherein the sixth electrode surrounds the fifth electrode, and sensing a third capacitance of the material based on a third response of the material to the third voltage.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s).

The use of ordinal numbers such as "first," "second," "third," and so on is meant to distinguish respective elements rather than to denote a particular order or importance of those elements.

The features, functions, and advantages that have been discussed can be achieved independently in various examples or can be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 5 is a top view of a circuit board, according to an example.

FIG. 6 is a cross sectional view of an electrode set, a material, and a spacer, according to an example.

FIG. 7 is a cross sectional view of an electrode set, a material, and a spacer, according to an example.

FIG. 8 is a cross sectional diagram of a material and a circuit board, according to an example.

FIG. 9 is a cross sectional diagram of a material and a circuit board, according to an example.

FIG. 10 is a top view of regions of a material, according to an example.

FIG. 19 is a block diagram of a method, according to an example.

FIG. 20 is a block diagram of a method, according to an example.

FIG. 21 is a block diagram of a method, according to an example.

FIG. 22 is a block diagram of a method, according to an example.

FIG. 23 is a block diagram of a method, according to an example.

FIG. 24 is a block diagram of a method, according to an example.

FIG. 25 is a block diagram of a method, according to an example.

FIG. 26 is a block diagram of a method, according to an example.

DETAILED DESCRIPTION

Figure 1:
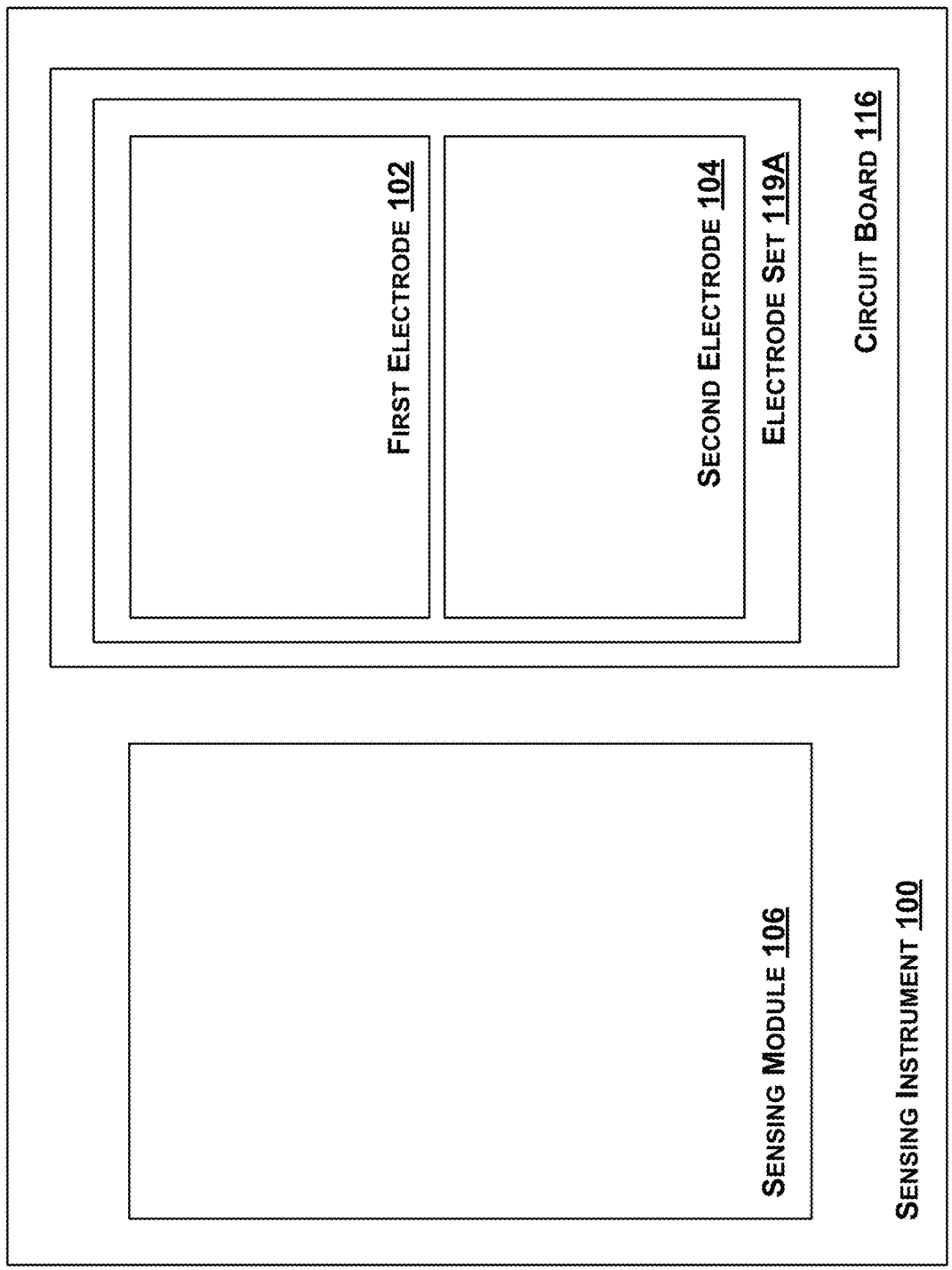
FIG. 1 is a block diagram of a sensing instrument, according to an example.

As discussed above, a need exists for instruments and methods that facilitate less invasive and quicker detection of corrosion in structural components. Often, the outer surfaces of these structural components are covered by a layer of paint and/or one or more passivation layers. Unlike conventional instruments and methods, the instruments and methods disclosed herein can be used to detect corrosion without removal of the paint or passivation layers.

Examples disclosed herein include a sensing instrument that includes a first electrode, a second electrode that surrounds the first electrode, and a sensing module configured to sense a capacitance of a material by applying a voltage between the first electrode and the second electrode while the first electrode and the second electrode are adjacent to the material.

Additional examples disclosed herein include a method of operating a sensing instrument that includes applying a voltage between a first electrode and a second electrode while the first electrode and the second electrode are positioned adjacent to a material. The second electrode surrounds the first electrode. The method further includes sensing a capacitance of the material based on a response of the material to the voltage.

Additionally or alternatively, the first electrode is coplanar with the second electrode and/or the first electrode and the second electrode take the form of concentric rings that are substantially parallel with an outer surface of the material under test. Generally, the first electrode and the second electrode do not make contact with the material (e.g., an aircraft wing skin) during operation, but the electric field formed between the first electrode and the second electrode penetrates into the material. The sensing module can include a signal generator configured to apply the voltage between the first electrode and the second electrode and a meter that is configured to sense a voltage response and/or a current response of the material to the applied voltage. The capacitance of the material adjacent to the first electrode and the second electrode can be derived based on the response. As the instrument is used to test different areas of the material, variances in capacitance sensed by the sensing module can be inferred to indicate areas of corrosion.

Additionally or alternatively, one-dimensional or two-dimensional arrays of electrode sets are formed. That is, several first electrodes and corresponding second electrodes form a row of electrode sets and/or multiple rows and columns of electrode sets. These instruments having multiple sets of (e.g., concentric and coplanar) electrodes are used to detect capacitances of the material at many different locations within the material (e.g., simultaneously). This capacitance data collected over a line or over an area of the material can be used to generate an "image" where pixel intensity or color is mapped to capacitance levels.

The aforementioned instruments and methods can be advantageous when compared to conventional instruments and methods because the aforementioned instruments and methods can involve less invasive and quicker detection of corrosion in various materials. For example, corrosion detection can be performed without removing paint or passivation layers from a surface of the material under test and without having to reapply the paint or passivation layers. The aforementioned instruments and methods can also be used to detect corrosion or other anomalies in materials that are not covered by paint or passivation layers.

Disclosed examples will now be described more fully hereinafter with reference to the accompanying Drawings, in which some, but not all of the disclosed examples are shown. Indeed, several different examples are described and should not be construed as limited to the examples set forth herein. Rather, these examples are described so that this disclosure will be thorough and complete and will fully convey the scope of the disclosure to those skilled in the art.

FIGS. 1-18 depict components of and functionality related to an aircraft, a sensing instrument, and/or a material under test.

FIG. 1 is a block diagram of a sensing instrument 100. The sensing instrument 100 includes a first electrode 102, a second electrode 104 that surrounds the first electrode 102, and a sensing module 106. As described in more detail below, the sensing module 106 is configured to sense a capacitance 108 of a material 110 by applying a voltage 112 between the first electrode 102 and the second electrode 104 while the first electrode 102 and the second electrode 104 are adjacent to the material 110. The first electrode 102, the second electrode 104, and perhaps other electrodes are collectively referred to as an electrode set 119A. The sensing instrument 100 also includes a circuit board 116 on which the first electrode 102, the second electrode 104, and perhaps other electrodes are positioned.

Figure 2:
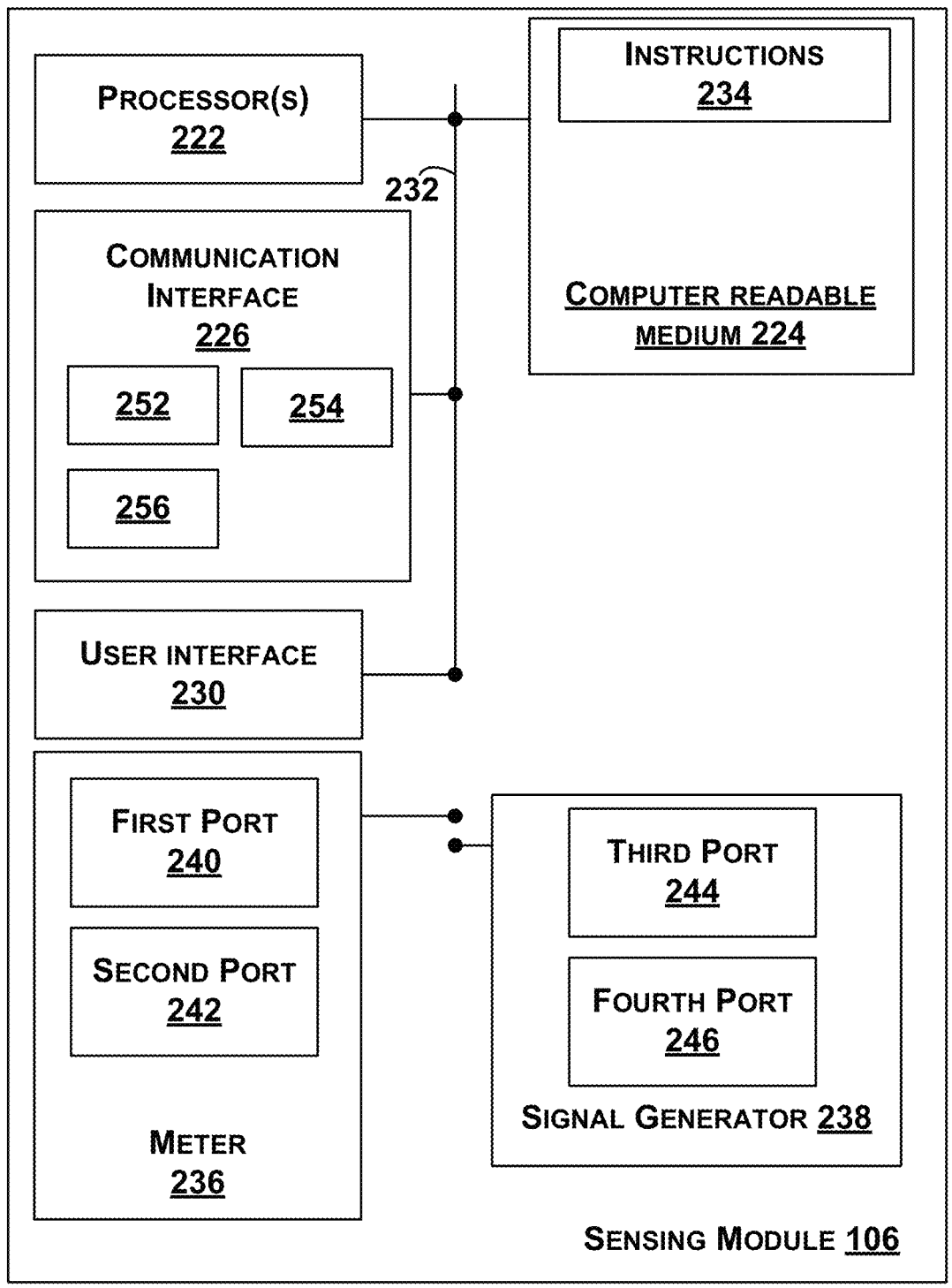
FIG. 2 is a block diagram of a sensing module, according to an example.

FIG. 2 is a block diagram of the sensing module 106. The sensing module 106 includes one or more processors 222, a non-transitory computer readable medium 224, a communication interface 226, a user interface 230, a meter 236, and a signal generator 238. Components of the sensing module 106 are linked together by a system bus, network, or other connection mechanism 232.

The one or more processors 222 can be any type of processor(s), such as a microprocessor, a digital signal processor, a multicore processor, etc., coupled to the non-transitory computer readable medium 224.

The non-transitory computer readable medium 224 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 224 stores instructions 234. The instructions 234 are executable by the one or more processors 222 to cause the sensing module 106 to perform any of the functions or methods described herein.

The communication interface 226 includes hardware to enable communication within the sensing module 106 and/or between the sensing module 106 and one or more other devices. The hardware includes transmitters 252, receivers 254, and antennas 256, for example. The communication interface 226 is configured to facilitate communication with one or more other devices, in accordance with one or more wired or wireless communication protocols. For example, the communication interface 226 is configured to facilitate wireless data communication for the sensing module 106 according to one or more wireless communication standards, such as one or more Institute of Electrical and Electronics Engineers (IEEE) 801.11 standards, ZigBee standards, Bluetooth standards, etc. As another example, the communication interface 226 is configured to facilitate wired data communication with one or more other devices.

The user interface 230 includes one or more pieces of hardware used to provide data and control signals to the sensing module 106. For instance, the user interface 230 can include a mouse or a pointing device, a keyboard or a keypad, a microphone, a touchpad, or a touchscreen, among other possible types of user input devices. Generally, the user interface 230 enables an operator to interact with a graphical user interface (GUI) provided by the sensing module 106. The user interface 230 generally includes a display component configured to display data. As one example, the user interface 230 includes a touchscreen display. As another example, the user interface 230 includes a flat-panel display, such as a liquid-crystal display (LCD) or a light-emitting diode (LED) display.

The sensing module 106 also includes the meter 236 (e.g., a multimeter). The meter 236 includes a first port 240 and a second port 242. The first port 240 is configured to receive an electrical cable or another electrical connector that connects the first electrode 102 to the first port 240 and the second port 242 is configured to receive an electrical cable or another electrical connector that connects the second electrode 104 to the second port 242. The meter 236 is configured to sense steady state and transient voltages present between the first port 240 and the second port 242. The meter 236 is also configured to sense steady state and transient currents that flow from the first port 240 to the second port 242.

The sensing module 106 also includes the signal generator 238. The signal generator 238 includes a third port 244 and a fourth port 246. The third port 244 is configured to receive an electrical cable or another electrical connector that connects the first electrode 102 to the third port 244 and the fourth port 246 is configured to receive an electrical cable or another electrical connector that connects the second electrode 104 to the fourth port 246. The signal generator 238 is configured to generate AC or DC voltage or current signals between the third port 244 and the fourth port 246 to induce a steady state and/or transient voltage and/or current response within a material under test. The response of the material is sensed by the meter 236 and used to determine a capacitance of the material, for example.

Figure 3:
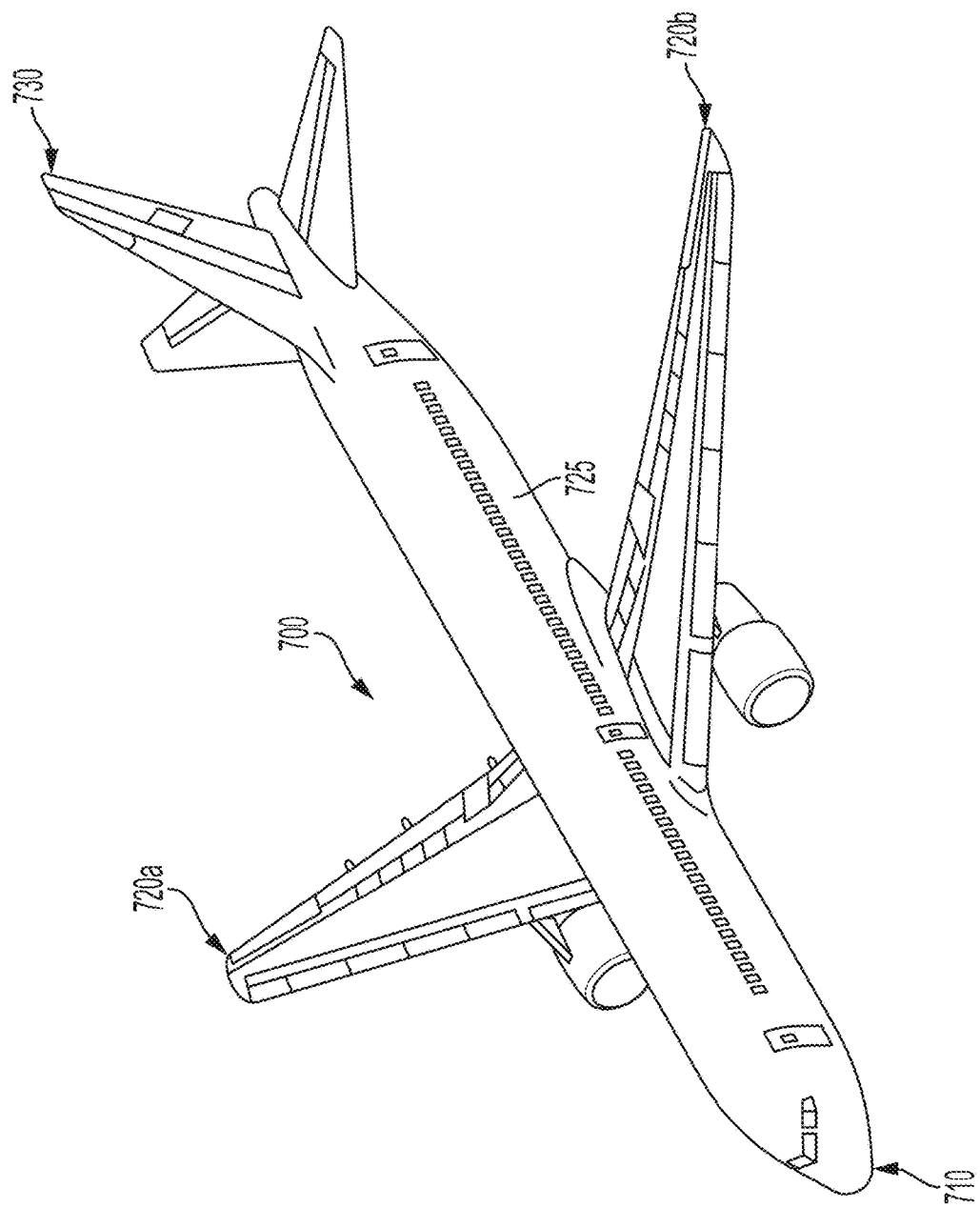
FIG. 3 is a perspective view of an aircraft, according to an example.

FIG. 3 is a perspective view of an aircraft 700. The aircraft 700 includes a nose 710, a wing 720a, a wing 720b, a fuselage 725, and a tail 730. The aircraft 700 includes many areas arranged for storage of items during flight. In one example, the fuselage 725 includes storage underneath a passenger compartment for storing luggage and other items or supplies. In another example, the passenger compartment in the fuselage 725 includes overhead bins and under seat areas for storing further items.

Additionally or alternatively, the sensing instrument 100 is used to determine capacitances of various areas of structural components (e.g., skins) that form various components of the aircraft 700. Capacitances that vary significantly from a baseline typically are inferred to indicate an area of corrosion (e.g., a subsurface area of corrosion) because changes in capacitance generally indicate a change in material composition.

Although an aircraft is used as an example herein, the sensing instrument 100 can also be used to measure the capacitance of and/or detect material anomalies within other structures such as buildings, bridges, boats, ships, and railcars, or other vehicles.

Figure 4:
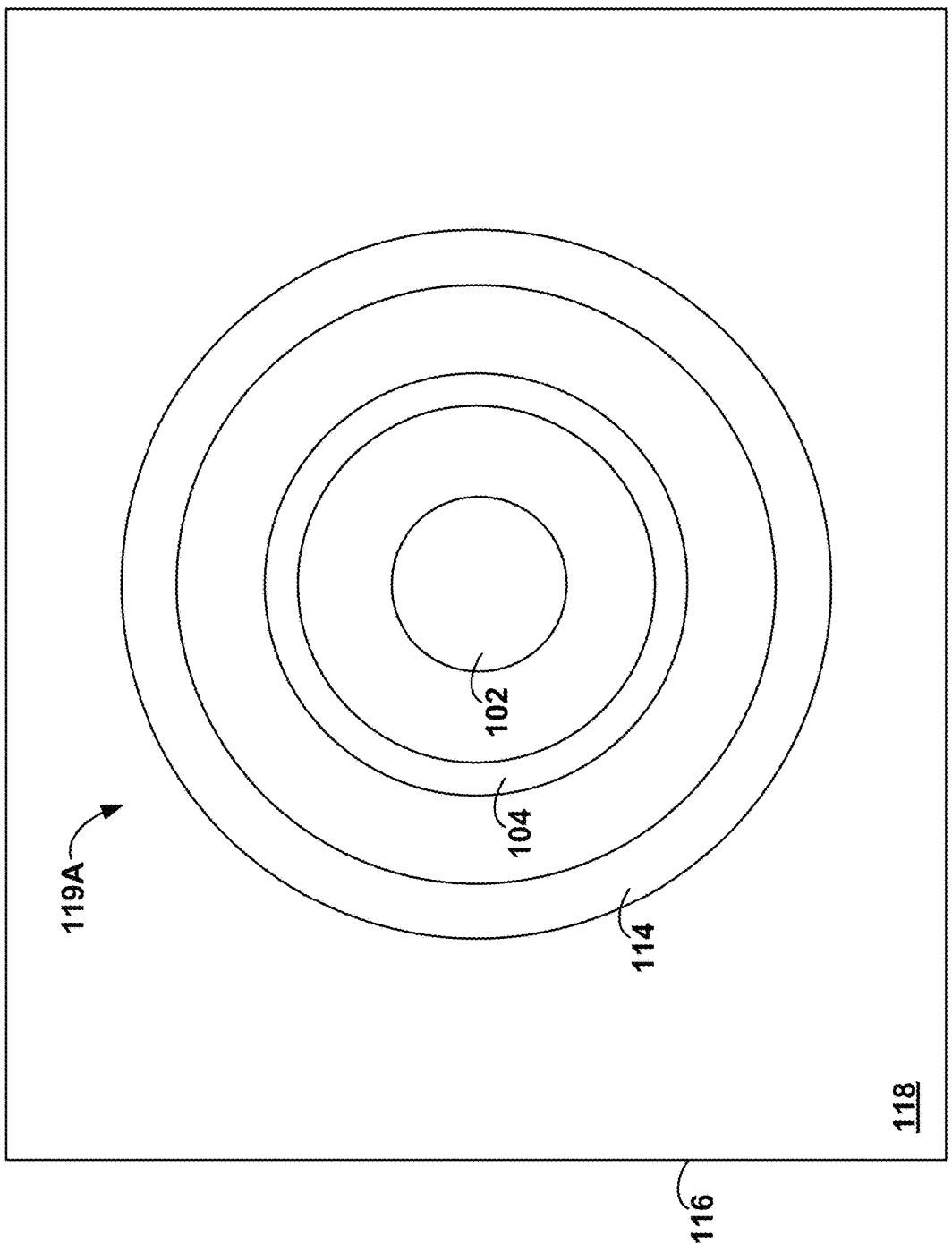
FIG. 4 is a bottom view of a circuit board and electrodes, according to an example.

FIG. 4 is a bottom view of the circuit board 116 and electrodes. The electrode set 119A includes the first electrode 102, the second electrode 104, and a third electrode 114. The first electrode 102, the second electrode 104, and the third electrode 114 are electrically conductive (e.g., metallic) and are printed or otherwise formed on a first side 118 (e.g., a bottom side) of the circuit board 116.

The first electrode 102 has a circular shape, but other examples are possible. The second electrode 104 and the third electrode 114 each have an annular shape, but other examples are possible. The second electrode 104 surrounds the first electrode 102 and the third electrode 114 surrounds both the second electrode 104 and the first electrode 102. The first electrode 102, the second electrode 104, and the third electrode 114 have respective thicknesses ranging from 1 µm to 1 mm measured normal to the first side 118. Thicknesses of the first electrode 102, the second electrode 104, and the third electrode 114 are generally substantially equal to each other.

The first electrode 102 and the second electrode 104 together have reflectional symmetry and rotational symmetry. As such, the first electrode 102, the second electrode 104, and the third electrode 114 also together have rotational and reflectional symmetry. The first electrode 102, the second electrode 104, and the third electrode 114 are also coplanar. The rotational symmetry, the reflectional symmetry, and the electrodes being coplanar can help to eliminate undesirable electric field fringing during use.

The circuit board 116 can be a printed circuit board (PCB) or another type of circuit board. Generally, the circuit board 116 will have an electrically insulating core with conductive circuitry printed thereon.

FIG. 5 is a top view of the circuit board 116. The circuit board 116 includes a metal shielding layer 120 on a second side 122 of the circuit board 116 that is opposite the first side 118. The metal shielding layer 120 can help isolate the circuit board 116 from external electric fields.

FIG. 6 is a cross sectional view of the electrode set 119A, the material 110, and a spacer 124. In FIG. 6, the spacer 124 takes the form of a piece of electrically insulating material, such as foam or another low-κ dielectric material (e.g., $1.0<\kappa<3.0$). For ease of use, the spacer 124 will typically be formed of lightweight materials. The spacer 124 maintains a minimum distance 126 (e.g., substantially equal to a thickness of the spacer 124) between (i) the first electrode 102 or the second electrode 104 and (ii) the material 110. The minimum distance 126 could range from 0.05 mm to 3 mm, but other examples are possible. The minimum distance 126 is generally selected such that electric fields that are generated between the first electrode 102 and the second electrode 104 penetrate into the material 110 without the material 110 creating a short circuit between the first electrode 102 and the second electrode 104. The material 110 is a portion of the nose 710, the wing 720a, the wing 720b, the fuselage 725, or the tail 730 of the aircraft 700, for example. Additionally or alternatively, the minimum distance 126 could be implemented as approximately equal to the diameter $d_3$ of the electrode set 119A (see FIG. 16).

FIG. 7 is a cross sectional view of the electrode set 119A, the material 110, and another embodiment of the spacer 124. In FIG. 7, the spacer 124 includes a platform 125 and three studs 123. The studs 123 have equal depths corresponding to the vertical direction in FIG. 7. The equal depths define a plane. The depth of the stud 123 added to a depth of the platform 125 is equal to the minimum distance 126. The studs 123 can be formed of plastic, but other examples are possible. In some examples, the studs 123 are replaced with wheels that have equal thicknesses. The three studs 123 define a plane such that the electrode set 119A can be maintained a substantially constant distance (e.g., the minimum distance 126) from the material 110, which helps maintain the accuracy and/or consistency of the capacitance measurements.

FIG. 8 is a cross sectional diagram of the material 110 and the circuit board 116. The signal generator 238 of the sensing instrument 100 applies a voltage 112 (e.g., AC and/or DC) between the first electrode 102 and the second electrode 104 while the first electrode 102 and the second electrode 104 are positioned adjacent to the material 110. As shown, the second electrode 104 surrounds the first electrode 102.

The first electrode 102 and the second electrode 104 being "adjacent" to the material 110 can mean that the first electrode 102 and the second electrode 104 are close enough to the material 110, based on the voltage 112 and the geometry of the first electrode 102 and the second electrode 104, to have a significant portion of an electric field 113 generated by the voltage 112 penetrate the material 110. For example, "adjacent" will generally mean that the first electrode 102 and the second electrode 104 are close enough to the material 110 (e.g., but not in contact) to accurately sense a capacitance of the material 110. In some examples, the term "adjacent" refers to a range of separation between the material 110 and the first electrode 102 or the second electrode 104 of 0.05 mm to 3 mm, but other examples are possible. One of ordinary skill in the art would be able to determine a suitable distance between the material 110 and the first electrode 102 and/or the second electrode 104, based on the voltage 112 and the geometry of the first electrode 102 and/or the second electrode 104.

Next, the meter 236 senses the capacitance 108 of the material 110 based on a response $V_1$ of the material 110 to the voltage 112. The response $V_1$ is generally sensed by the meter 236 between the first electrode 102 and the second electrode 104, but other examples are possible. The response $V_1$ takes the form of a transient or steady state voltage or current, for example, having a particular amplitude or magnitude and/or having a particular decay constant or phase relative to the voltage 112. The amplitude, the magnitude, the decay constant, and/or the phase is used to determine the capacitance 108. It should be noted that the signal generator 238 has a finite series resistance that will typically cause the response $V_1$ to be different from the voltage 112, because some voltage produced by the signal generator 238 is dropped across that series resistance and not entirely between the first electrode 102 and the second electrode 104.

FIG. 9 is a cross sectional diagram of the material 110 and a version of the circuit board 116 that includes the third electrode 114. The signal generator 238 applies a second voltage 135 between the first electrode 102 and the third electrode 114 concurrently with applying the first voltage 112 between the first electrode 102 and the second electrode 104. The second voltage 135 is applied while the third electrode 114 is positioned adjacent to the material 110 as well. As shown, the third electrode 114 surrounds the second electrode 104. The signal generator 238 applying the second voltage 135 will generally shape the electric field 113 formed between the first electrode 102 and the second electrode 104. For example, changing the magnitude and/or the polarity of the second voltage 135 typically varies a depth a significant portion of the electric field 113 penetrates into the material 110. Varying the depth of the electric field 113 allows for taking capacitance measurements of or sensing anomalies within varying depths of the material 110.

It should also be noted that, the first voltage 112 and the second voltage 135 can be generated in ways other than those depicted in FIG. 9. For example, the first voltage 112 and the second voltage 135 could both have a negative terminal at a common ground connection. Other examples are possible. Next, the meter 236 senses the capacitance 108 of the material 110 as described above with reference to FIG. 8. However, the second voltage 135 generally has an impact on the capacitance 108 detected by the meter 236, for example, by changing a volume of the material 110 that the capacitance 108 actually represents (e.g., by changing the shape of the electric field 113).

Figure 10:
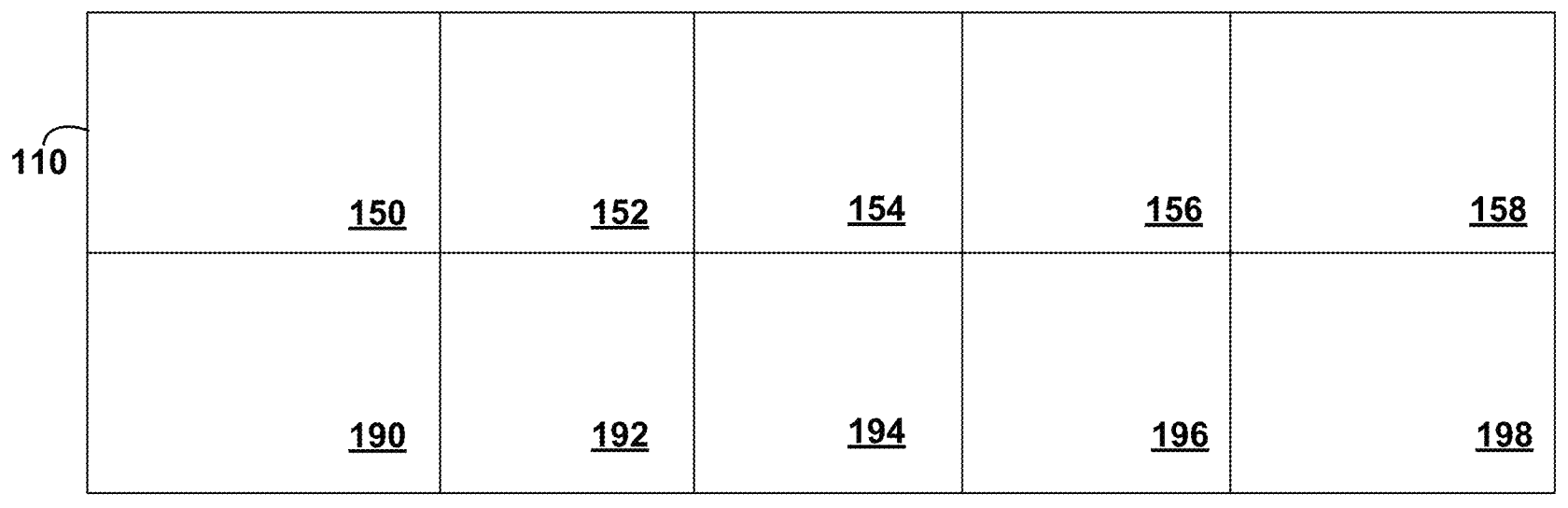

FIG. 10 is a top view of the material 110, depicting regions 150, 152, 154, 156, 158, 190, 192, 194, 196, and 198 of the material 110. As described below with reference to FIGS. 11-14, the sensing instrument 100 is used to determine respective capacitances corresponding to the regions 150, 152, 154, 156, 158, 190, 192, 194, 196, and 198 of the material 110.

Figure 11:
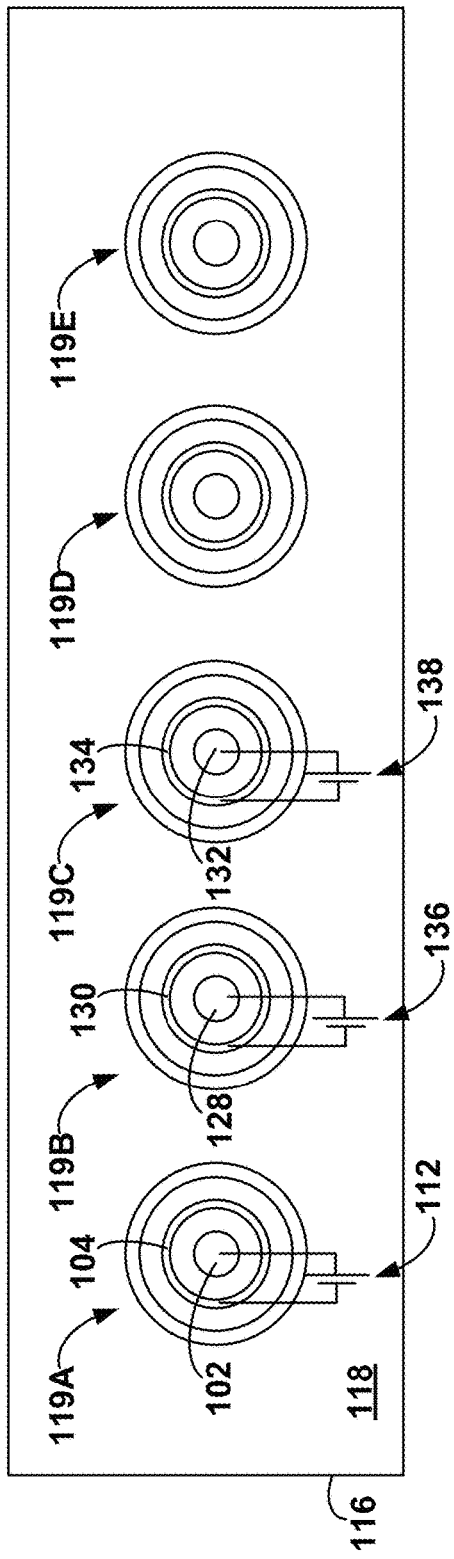
FIG. 11 is a bottom view of a row of electrode sets of a sensing instrument on a circuit board, according to an example.

FIG. 11 is a bottom view of a row of electrode sets 119A, 119B, 119C, 119D, and 119E of the sensing instrument 100 on the circuit board 116. Although five electrode sets are shown in FIG. 11, any number of electrode sets could be included as part of the circuit board 116. Additional electrode sets provide additional elements of independent control during testing of a material and also can reduce an amount of time needed to inspect a given area and/or volume of material.

The sensing instrument 100 includes the electrode set 119B on the first side 118 of the circuit board 116. The electrode set 119B includes a third electrode 128 and a fourth electrode 130 that surrounds the third electrode 128.

The sensing instrument 100 also includes the electrode set 119C on the first side 118 of the circuit board 116. The electrode set 119C includes a fifth electrode 132 and a sixth electrode 134 that surrounds the fifth electrode 132.

The sensing instrument 100 also includes the electrode set 119D and the electrode set 119E which both generally have all of the features of the electrode sets 119A-C (e.g., two or three concentric and/or coplanar electrodes).

As shown, the first electrode 102, the third electrode 128, and the fifth electrode 132 are collinear. Respective center points of the second electrode 104, the fourth electrode 130, and the sixth electrode 134 are also collinear. As such, electrode sets 119A, 119B, 119C, 119D, and 119E form a row that can be scanned over the material 110 to take capacitance measurements over a two-dimensional area.

The signal generator 238 applies a second voltage 136 between the third electrode 128 and the fourth electrode 130 while the third electrode 128 and the fourth electrode 130 are adjacent to the material 110 (not shown in FIG. 11). The signal generator 238 applies the second voltage 136 concurrent with applying the first voltage 112, for example.

The signal generator 238 also applies a third voltage 138 between the fifth electrode 132 and the sixth electrode 134 while the fifth electrode 132 and the sixth electrode 134 are adjacent to the material 110 (not shown in FIG. 11). The aforementioned voltages applied between electrodes are used to measure capacitance of the material 110 underneath the respective electrodes.

Figure 12:
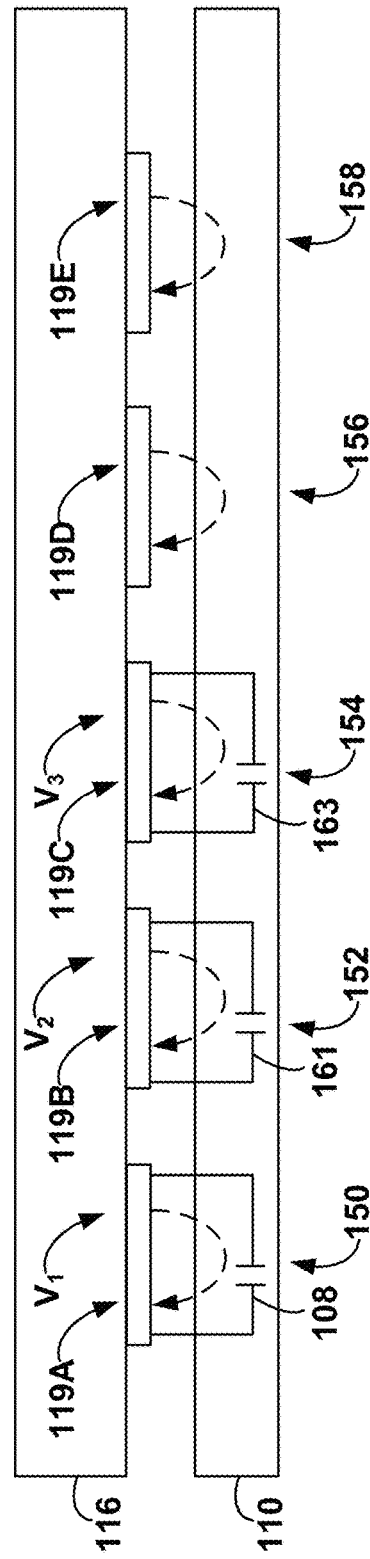
FIG. 12 is a cross-sectional view of a row of electrode sets of a sensing instrument and a material, according to an example.

FIG. 12 is a cross-sectional view of the row of electrode sets 119A, 119B, 119C, 119D, and 119E of the sensing instrument 100 on the circuit board 116.

The signal generator 238 applies the first voltage 112 between the first electrode 102 and the second electrode 104 while the first electrode 102 and the second electrode 104 are positioned adjacent to a first region 150 of the material 110. As shown, the second electrode 104 surrounds the first electrode 102. The circuit board 116 is positioned manually or automatically such that the first electrode 102 and the second electrode 104 are positioned adjacent to the first region 150.

The meter 236 senses the first capacitance 108 of the material 110 (e.g., the first region 150) based on the first response $V_1$ of the material 110 to the first voltage 112.

The signal generator 238 applies the second voltage 136 between the third electrode 128 and the fourth electrode 130 while the third electrode 128 and the fourth electrode 130 are positioned adjacent to a second region 152 of the material 110. As shown, the fourth electrode 130 surrounds the third electrode 128. Once the circuit board 116 is positioned such that the first electrode 102 and the second electrode 104 are positioned adjacent to the first region 150, the circuit board 116 will also be positioned such the third electrode 128 and the fourth electrode 130 are adjacent to the second region 152.

The meter 236 senses a second capacitance 161 of the material 110 (e.g., the second region 152) based on a second response $V_2$ of the material 110 to the second voltage 136.

The signal generator 238 applies the third voltage 138 between the fifth electrode 132 and the sixth electrode 134 while the fifth electrode 132 and the sixth electrode 134 are positioned adjacent to a third region 154 of the material 110. As shown, the sixth electrode 134 surrounds the fifth electrode 132. Once the circuit board 116 is positioned such that the first electrode 102 and the second electrode 104 are positioned adjacent to the first region 150, the circuit board 116 will also inherently be positioned such the fifth electrode 132 and the sixth electrode 134 are adjacent to the third region 154.

The meter 236 senses a third capacitance 163 of the material 110 (e.g., the third region 154) based on a third response $V_3$ of the material 110 to the third voltage 138.

The signal generator 238 applies the first voltage 112, the second voltage 136, and the third voltage 138 simultaneously, but other examples are possible. Generally, the first voltage 112, the second voltage 136, and the third voltage 138 are substantially equal in magnitude, timing, phase, and/or waveform. However, there may be situations where the first voltage 112, the second voltage 136, and/or the third voltage 138 having different amplitudes, timing, phase, and/or waveforms could be beneficial.

Figure 13:
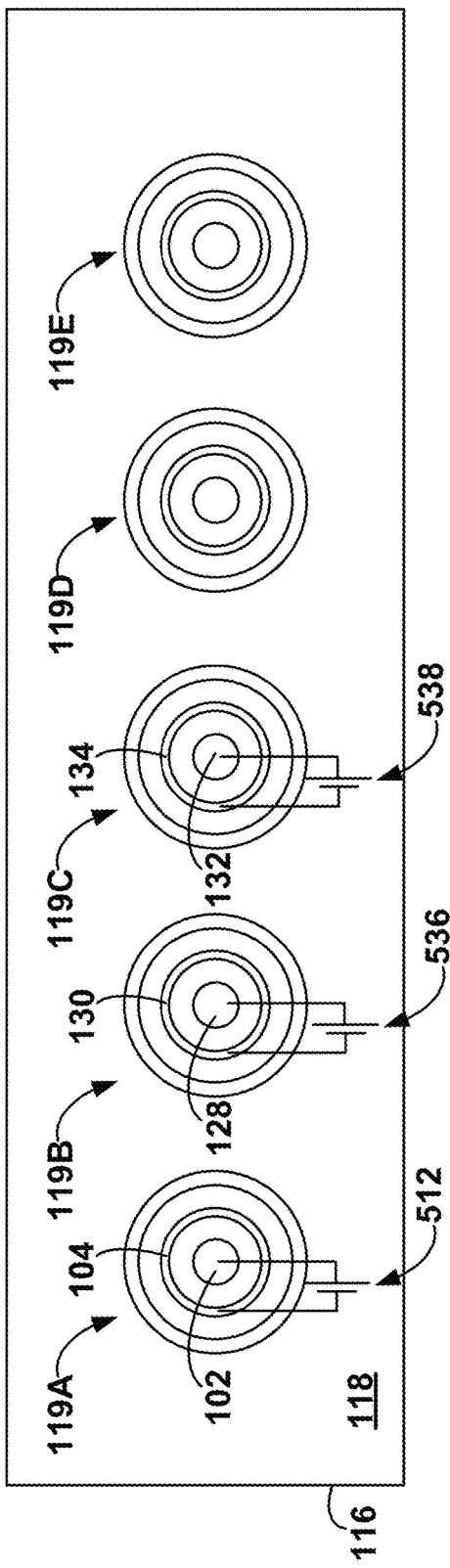
FIG. 13 is a bottom view of a row of electrode sets of a sensing instrument on a circuit board, according to an example.

FIG. 13 is a bottom view of the row of electrode sets 119A, 119B, 119C, 119D, and 119E of the sensing instrument 100 on the circuit board 116.

Figure 14:
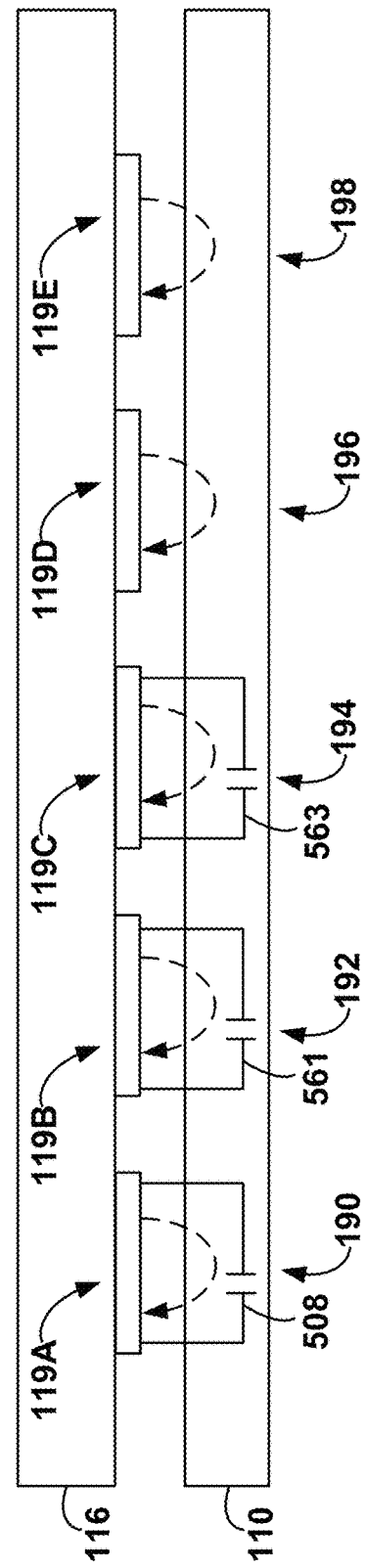
FIG. 14 is a cross-sectional view of a row of electrode sets of a sensing instrument and a material, according to an example.

FIG. 14 is a cross-sectional view of the row of electrode sets 119A, 119B, 119C, 119D, and 119E of the sensing instrument 100 on the circuit board 116. In FIG. 14, the circuit board 116 has been moved manually or automatically to a position relative to the material 110 that is different from the position depicted in FIG. 12.

The signal generator 238 applies a fourth voltage 512 between the first electrode 102 and the second electrode 104 while the first electrode 102 and the second electrode 104 are positioned adjacent to a fourth region 190 of the material 110. The fourth voltage 512 can be the same as the first voltage 112, but it is not required.

The meter 236 senses a fourth capacitance 508 of the material 110 (e.g., the fourth region 190) based on a fourth response $V_4$ of the material 110 to the fourth voltage 512.

The signal generator 238 applies a fifth voltage 536 between the third electrode 128 and the fourth electrode 130 while the third electrode 128 and the fourth electrode 130 are positioned adjacent to a fifth region 192 of the material 110. Once the circuit board 116 is positioned such that the first electrode 102 and the second electrode 104 are positioned adjacent to the fourth region 190, the circuit board 116 will also be positioned such the third electrode 128 and the fourth electrode 130 are adjacent to the fifth region 192.

The meter 236 senses a fifth capacitance 561 of the material 110 (e.g., the fifth region 192) based on a fifth response $V_5$ of the material 110 to the fifth voltage 536.

The signal generator 238 applies a sixth voltage 538 between the fifth electrode 132 and the sixth electrode 134 while the fifth electrode 132 and the sixth electrode 134 are positioned adjacent to a sixth region 194 of the material 110. Once the circuit board 116 is positioned such that the first electrode 102 and the second electrode 104 are positioned adjacent to the fourth region 190, the circuit board 116 will also be positioned such the fifth electrode 132 and the sixth electrode 134 are adjacent to the sixth region 194.

The meter 236 senses a sixth capacitance 563 of the material 110 (e.g., the sixth region 194) based on a sixth response $V_6$ of the material 110 to the sixth voltage 538.

The signal generator 238 applies the fourth voltage 512, the fifth voltage 536, and the sixth voltage 538 simultaneously, but this is not necessary.

The fifth voltage 536 and the sixth voltage 538 can be the same as the fourth voltage 512, but it is not necessary.

Figure 15:
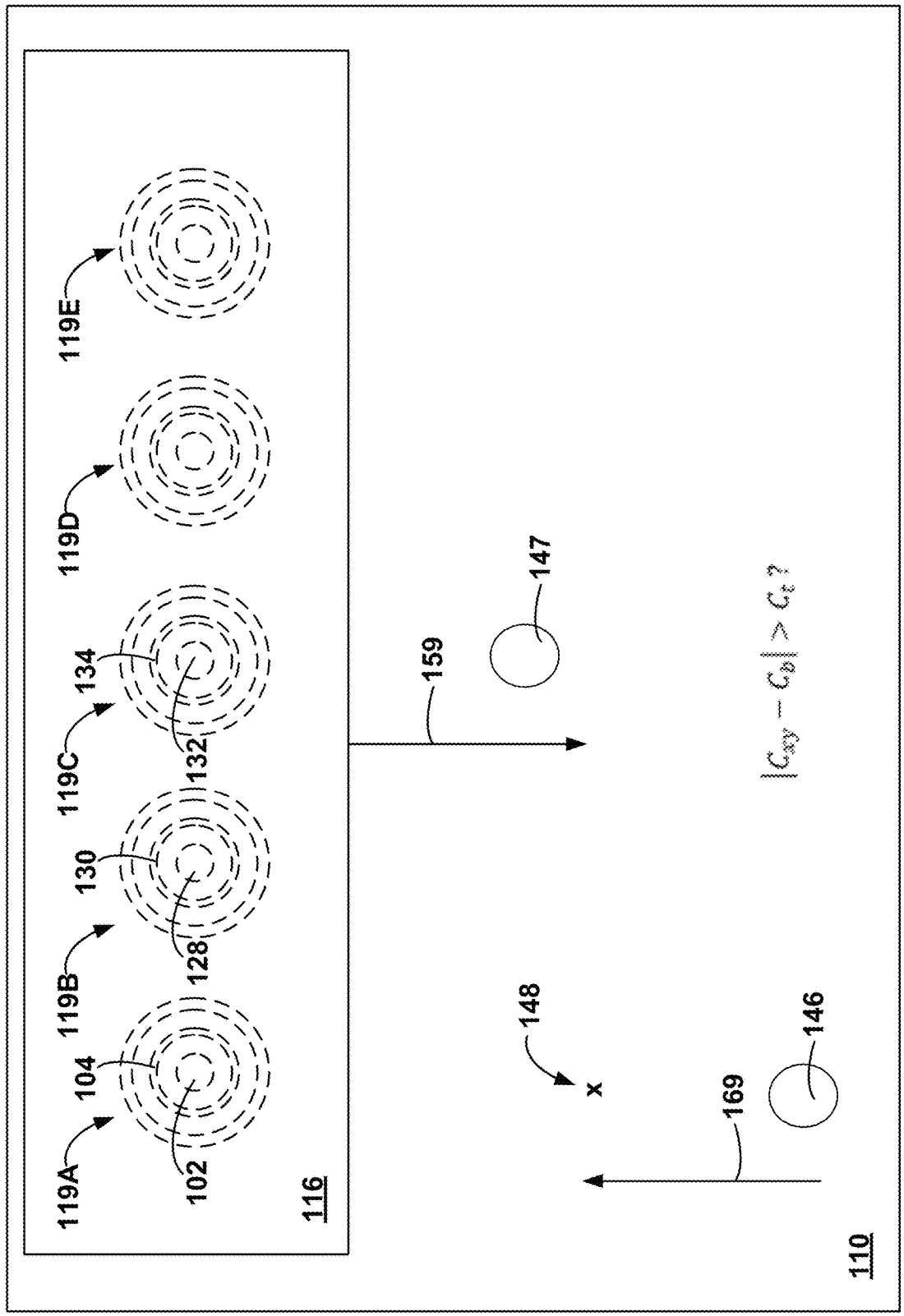
FIG. 15 is a top view of a circuit board and a material, according to an example.

FIG. 15 is a top view of the circuit board 116 and the material 110. The circuit board 116 is moved or scanned automatically or manually in a direction 159 to systematically examine various regions of the material 110 using the electrode sets 119A, 119B, 119C, 119D, and 119E. During or prior to such a scan, the sensing module 106 can determine that a baseline capacitance $C_b$ represents an average expected capacitance of the material 110 in the absence of substantial anomalies such as corrosion. In one example, the electrode set 119A is eventually positioned over an anomaly 146 of the material 110 (e.g., an area of corrosion). The sensing module 106 determines that the capacitance 108 of the material 110 (e.g., the anomaly 146) differs from the baseline capacitance $C_b$ by more than a threshold difference $C_t$. In FIG. 15, the capacitance 108 is represented by $C_{xy}$. In some examples, the threshold difference $C_t$ could be 1%, 2%, 3%, 5%, 10%, or 15% of the baseline capacitance $C_b$. The threshold difference $C_t$ is selected to represent a variance in capacitance that is great enough to lend some degree of certainty that an anomaly has been detected. One of ordinary skill in the art would recognize (e.g., via diagnostic testing) how to select a threshold difference that accurately represents an anomaly in the material 110.

Figure 17:
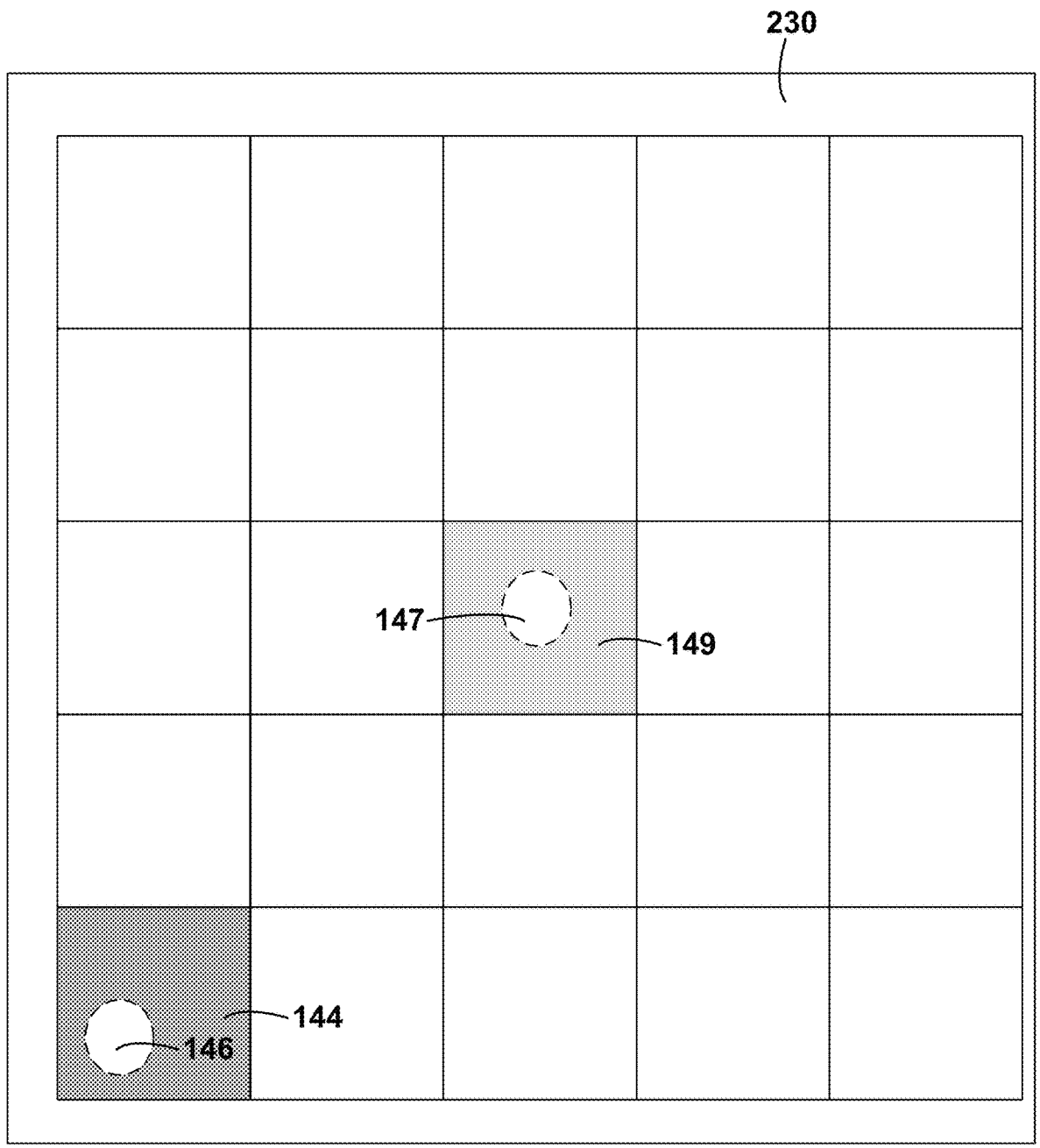
FIG. 17 shows a display component of a user interface, according to an example.

In response to the sensing module 106 determining that the capacitance 108 (e.g., $C_{xy}$) of the material 110 (e.g., the anomaly 146) differs from the baseline capacitance $C_b$ by more than the threshold difference $C_t$, the user interface 230 provides an indication 144 that the anomaly 146 exists beneath the first electrode 102 and the second electrode 104. This is shown in FIG. 17 and discussed in more detail below.

After examining the anomaly 146, the circuit board 116 is moved in a direction 169 such that the electrode set 119A is over a testing region 148 of the material 110. While the first electrode 102 and the second electrode 104 are moved over the material 110 from the anomaly 146 to be adjacent to the testing region 148, the electrode set 119A (e.g., continuously) senses a capacitance of the material 110. The sensing module 106 low-pass filters the capacitance sensed while moving the first electrode 102 and the second electrode 104 in the direction 169. The low-pass filtering helps disregard changes in capacitance that can occur due to the distance between the electrode set 119A and the material 110 changing slowly while the circuit board 116 is moved in the direction 169. This change in distance is attributed to user error or to non-idealities of the spacer 124, for example. The low-pass filtering can allow focus on more abrupt changes in capacitance which more likely represent changes in composition of the material 110. Gradual changes in capacitance that occur while the circuit board 116 moves can thus be ignored because those gradual changes likely reflect non-idealities of the sensing instrument 100 itself and not changes in the composition of the material 110.

Additionally, the sensing module 106 uses the electrode set 119C to determine that a capacitance of the material 110 corresponding to an anomaly 147 differs from the baseline capacitance $C_b$ by more than the threshold difference $C_t$ and responsively provide an indication 149 via the user interface 230 that the anomaly 147 exists beneath the electrode set 119C. This is shown in FIG. 17 and discussed in more detail below.

Figure 16:
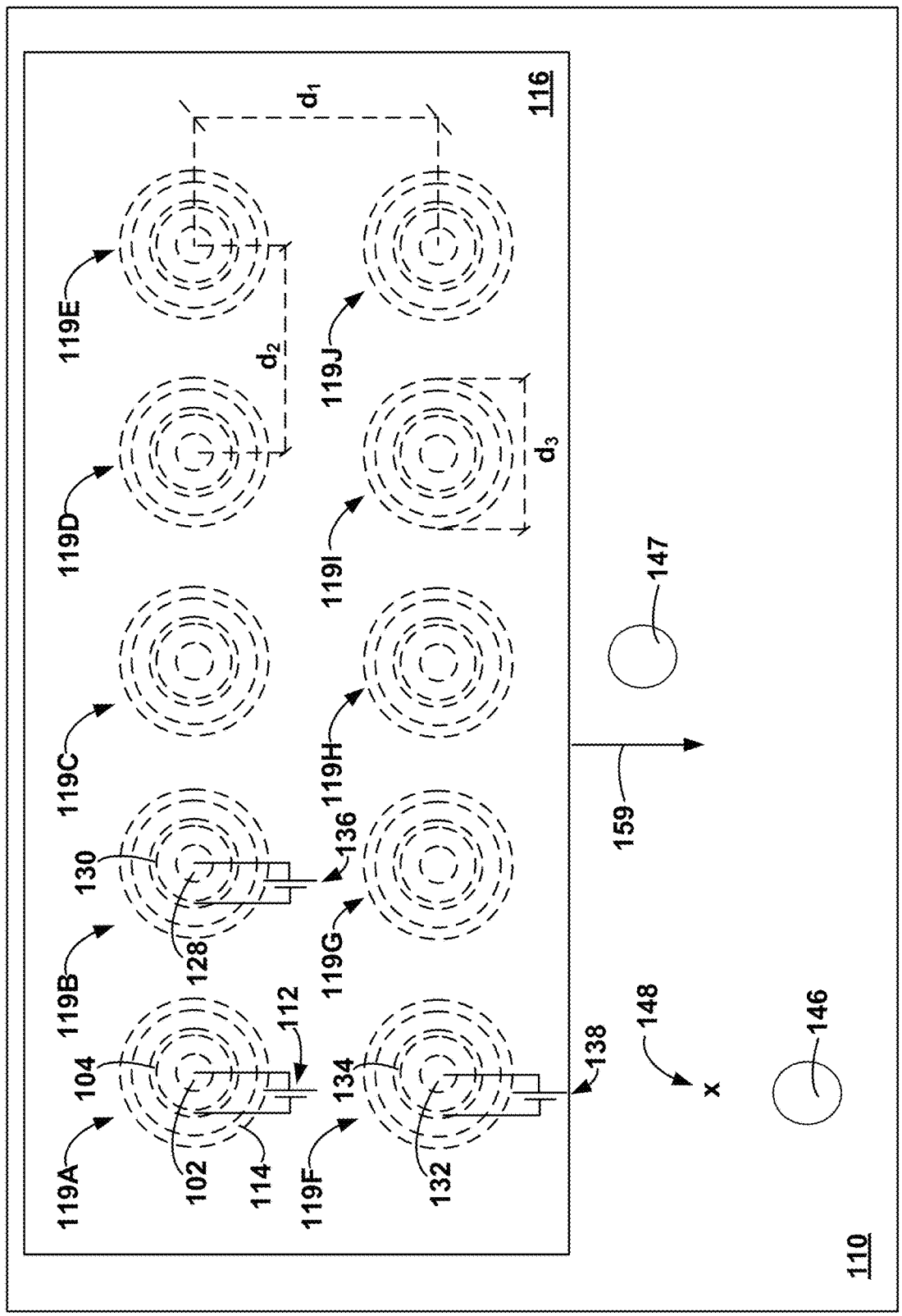
FIG. 16 is a top view of a circuit board and a material, according to an example.

FIG. 16 is a top view of another embodiment of the circuit board 116 and the material 110. As shown, the first electrode 102, the third electrode 128, and the fifth electrode 132 are not collinear in this embodiment. FIG. 16 shows a three-dimensional array of electrode sets 119A, 119B, 119C, 119D, 119E, 119F, 119G, 119H, 119I, and 119J. The three-dimensional array can be useful in quickly inspecting large volumes and/or areas of the material 110.

The circuit board 116 is moved or scanned automatically or manually in a direction 159 to systematically examine various regions of the material 110 using one or more of the electrode sets 119A, 119B, 119C, 119D, 119E, 119F, 119G, 119H, 119I, and 119J. During or prior to such a scan, the sensing module 106 can determine that a baseline capacitance $C_b$ represents an average expected capacitance of the material 110 in the absence of substantial abnormalities such as corrosion. In one example, the electrode set 119F is eventually positioned over an anomaly 146 of the material 110 (e.g., an area of corrosion). The sensing module 106 determines that the capacitance 108 of the material 110 (e.g., the anomaly 146) differs from the baseline capacitance $C_b$ by more than a threshold difference $C_t$. In FIG. 16, the capacitance 108 is represented by $C_{xy}$. In some examples, the threshold difference $C_t$ could 1%, 2%, 3%, 5%, 10%, or 15% of the baseline capacitance $C_b$, but other examples are possible. The threshold difference $C_t$ is selected to represent a variance in capacitance that is great enough to lend some degree of certainty that an anomaly has been detected.

In response to the sensing module 106 determining that the capacitance 108 (e.g., $C_{xy}$) of the material 110 (e.g., the anomaly 146) differs from the baseline capacitance $C_b$ by more than the threshold difference $C_t$, the user interface 230 provides an indication 144 that the anomaly 146 exists beneath the fifth electrode 132 and the sixth electrode 134. This is shown in FIG. 17 and discussed in more detail below.

Additionally, the sensing module 106 uses the electrode set 119C to determine that a capacitance of the material 110 corresponding to the anomaly 147 differs from the baseline capacitance $C_b$ by more than the threshold difference $C_t$ and responsively provide an indication 149 via the user interface 230 that the anomaly 147 exists beneath the electrode set 119C. This is shown in FIG. 17 and discussed in more detail below.

As shown in FIG. 16, the electrode sets 119A-E are respectively separated from the electrode sets 119F-J by a distance $d_1$. On another axis, the electrode sets (e.g., the electrode set 119D and the electrode set 119E) are separated by a distance $d_2$. Generally, the distance $d_1$ and the distance $d_2$ can be selected and implemented based on the size of the anomalies that are of interest and/or are anticipated. For example, if the anomalies of interest have diameters that are similar in scale to the diameters $d_3$ of the electrode sets 119A-J, $d_1$ and $d_2$ can be implemented as approximately half of $d_3$. ($d_1$, $d_2$, and $d_3$ are not necessarily shown to scale in FIG. 16.) In examples in which the third electrode 114 is used to electromagnetically isolate the electrode set 119A from the other electrode sets, the electrode sets 119A-J could nearly abut each other.

FIG. 17 shows a display component of the user interface 230. As discussed above, the user interface 230 provides the indication 144 that the anomaly 146 exists beneath the first electrode 102 and the second electrode 104. For example, the indication 144 can include darkening, lightening, or changing a color of a region of the display component that corresponds to the anomaly 146. In a similar fashion, the user interface 230 also provides the indication 149 that the anomaly 147 exists beneath the electrode set 119C or the electrode set 119H.

The capacitance corresponding to the anomaly 147 might differ less from the baseline capacitance $C_b$ when compared to the capacitance corresponding to the anomaly 146. As such, the indication 149 might indicate that via a difference in brightness or color when compared to the indication 144. For example, lower pixel intensity could correlate with a higher variance from the baseline capacitance, or a color scale could be mapped to different levels of difference from the baseline capacitance $C_b$. In some examples, the actual capacitance values could be displayed at each respective region within the user interface 230. Other examples are possible. These concepts are also applied three-dimensionally to achieve a three dimensional mapping of abnormalities within the material 110. Such mappings can be obtained periodically over time to identify trends in deterioration of the material 110.

Figure 18:
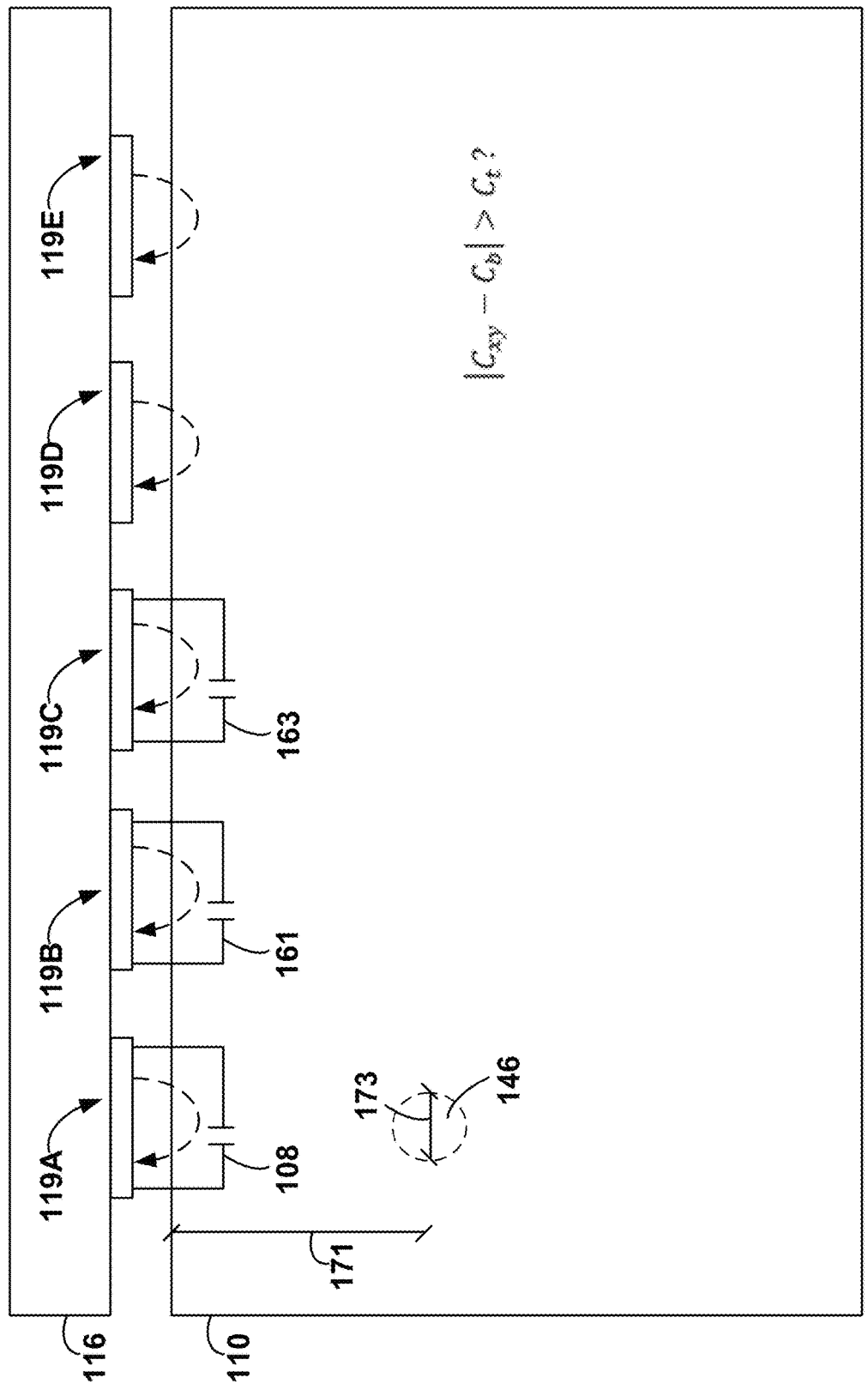
FIG. 18 is a cross sectional view of a circuit board and a material, according to an example.

FIG. 18 is a cross sectional view of the circuit board 116 and the material 110. The sensing module 106 determines that the first capacitance 108 of the material 110 differs from the baseline capacitance $C_b$ by more than the threshold difference $C_t$ and responsively determine a depth 171 of the anomaly 146 beneath the first electrode 102 and the second electrode 104 (e.g., the electrode set 119A) based on the first capacitance 108, the second capacitance 161, and the third capacitance 163. Additionally, the user interface 230 provides an indication (e.g., a numeric display) of the depth 171 of the anomaly 146 beneath the first electrode 102 and the second electrode 104. In some examples, crosstalk phenomena exist in which the electrode set 119A, the electrode set 119B, and the electrode set 119C could all detect the anomaly 146, with the respective deviation in capacitance from the baseline capacitance $C_b$ being inversely proportional to the distance of the electrode set from the anomaly 146. In this way, triangulation techniques could be applied to the first capacitance 108, the second capacitance 161, and the third capacitance 163 to determine the depth 171 and/or a size 173 (e.g., a diameter) of the anomaly 146. Accordingly, the user interface 230 provides an indication (e.g., a numeric display) of the size 173 and/or the depth 171.

FIGS. 19-26 are block diagrams of methods 200, 201, 203, 205, 300, 301, 303, and 305 for operating a sensing instrument. The methods 200, 201, 203, 205, 300, 301, 303, and 305 present examples of methods that could be used with the sensing instrument 100 and the material 110 as shown in FIGS. 1-18. As shown in FIGS. 19-26, the methods 200, 201, 203, 205, 300, 301, 303, and 305 include one or more operations, functions, or actions as illustrated by blocks 202, 204, 206, 208, 210, 212, 214, 302, 304, 306, 308, 310, 312, 314, 316, 318, 320, 322, 324, 326, 328, 330, 332, 334, and 336. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

FIG. 19 is a block diagram of the method 200.

At block 202, the method 200 includes applying the first voltage 112 between the first electrode 102 and the second electrode 104 while the first electrode 102 and the second electrode 104 are positioned adjacent to the material 110. In this context, the second electrode 104 surrounds the first electrode 102.

At block 204, the method 200 includes sensing the first capacitance 108 of the material 110 based on the response $V_1$ of the material 110 to the first voltage 112.

FIG. 20 is a block diagram of the method 201.

At block 206, the method 201 includes applying the second voltage 135 between the first electrode 102 and the third electrode 114 concurrently with applying the first voltage 112. The second voltage 135 is applied while the third electrode 114 is positioned adjacent to the material 110. The third electrode 114 surrounds the second electrode 104.

FIG. 21 is a block diagram of the method 203.

At block 208, the method 203 includes determining that the first capacitance 108 of the material 110 differs from the baseline capacitance $C_b$ by more than the threshold difference $C_t$.

At block 210, the method 203 includes responsive to the determining, providing the indication 144 via the user interface 230 that the anomaly 146 exists beneath the first electrode 102 and the second electrode 104.

FIG. 22 is a block diagram of the method 205.

At block 212, the method 205 includes sensing the first capacitance 108 of the material 110 while moving the first electrode 102 and the second electrode 104 over the material 110 to be adjacent to the testing region 148 of the material 110.

At block 214, the method 205 includes low-pass filtering the first capacitance 108 sensed while moving the first electrode 102 and the second electrode 104.

FIG. 23 is a block diagram of the method 300.

At block 302, the method 300 includes applying the first voltage 112 between the first electrode 102 and the second electrode 104 while the first electrode 102 and the second electrode 104 are positioned adjacent to the first region 150 of the material 110. In this context, the second electrode 104 surrounds the first electrode 102.

At block 304, the method 300 includes sensing the first capacitance 108 of the material 110 based on the first response $V_1$ of the material 110 to the first voltage 112.

At block 306, the method 300 includes applying the second voltage 136 between the third electrode 128 and the fourth electrode 130 while the third electrode 128 and the fourth electrode 130 are positioned adjacent to the second region 152 of the material 110. In this context, the fourth electrode 130 surrounds the third electrode 128.

At block 308, the method 300 includes sensing the second capacitance 161 of the material 110 based on the second response $V_2$ of the material 110 to the second voltage 136.

At block 310, the method 300 includes applying the third voltage 138 between the fifth electrode 132 and the sixth electrode 134 while the fifth electrode 132 and the sixth electrode 134 are positioned adjacent to the third region 154 of the material 110. In this context, the sixth electrode 134 surrounds the fifth electrode 132.

At block 312, the method 300 includes sensing the third capacitance 163 of the material 110 based on the third response $V_3$ of the material 110 to the third voltage 138.

FIG. 24 is a block diagram of the method 301.

At block 314, the method 301 includes determining that the first capacitance 108 of the material 110 differs from the baseline capacitance $C_b$ by more than the threshold difference $C_t$.

At block 316, the method 301 includes, responsive to the determining, determining the depth 171 of the anomaly 146 beneath the first electrode 102 and the second electrode 104 based on the first capacitance 108, the second capacitance 161, and the third capacitance 163.

At block 318, the method 301 includes providing the indication via the user interface 230 of the depth 171 of the anomaly 146 beneath the first electrode 102 and the second electrode 104.

FIG. 25 is a block diagram of the method 303.

At block 320, the method 303 includes determining that the first capacitance 108 of the material 110 differs from the baseline capacitance $C_b$ by more than the threshold difference $C_t$.

At block 322, the method 303 includes responsive to the determining, determining the size 173 of the anomaly 146 beneath the first electrode 102 and the second electrode 104 based on the first capacitance 108, the second capacitance 161, and the third capacitance 163.

At block 324, the method 303 includes providing the indication via the user interface 230 of the size 173 of the anomaly 146 beneath the first electrode 102 and the second electrode 104.

FIG. 26 is a block diagram of the method 305.

At block 326, the method 305 includes applying the fourth voltage 512 between the first electrode 102 and the second electrode 104 while the first electrode 102 and the second electrode 104 are positioned adjacent to the fourth region 190 of the material 110.

At block 328, the method 305 includes sensing the fourth capacitance 508 of the material 110 based on the fourth response $V_4$ of the material 110 to the fourth voltage 512.

At block 330, the method 305 includes applying the fifth voltage 536 between the third electrode 128 and the fourth electrode 130 while the third electrode 128 and the fourth electrode 130 are positioned adjacent to the fifth region 192 of the material 110.

At block 332, the method 305 includes sensing the fifth capacitance 561 of the material 110 based on the fifth response $V_5$ of the material 110 to the fifth voltage 536.

At block 334, the method 305 includes applying the sixth voltage 538 between the fifth electrode 132 and the sixth electrode 134 while the fifth electrode 132 and the sixth electrode 134 are positioned adjacent to the sixth region 194 of the material 110.

At block 336, the method 305 includes sensing the sixth capacitance 563 of the material 110 based on the sixth response $V_6$ of the material 110 to the sixth voltage 538.

Further, the disclosure comprises examples according to the following clauses:

Clause 1: A sensing instrument comprising: a first electrode; a second electrode that surrounds the first electrode; and a sensing module configured to sense a capacitance of a material by applying a voltage between the first electrode and the second electrode while the first electrode and the second electrode are adjacent to the material.

Clause 2: The sensing instrument of Clause 1, wherein the first electrode is coplanar with the second electrode.

Clause 3: The sensing instrument of any of Clauses 1 or 2, wherein the first electrode and the second electrode together have reflectional symmetry and rotational symmetry.

Clause 4: The sensing instrument of any of Clauses 1-3, further comprising a third electrode that surrounds the first electrode and the second electrode.

Clause 5: The sensing instrument of any of Clauses 1-4, further comprising a circuit board, the first electrode and the second electrode being positioned on a first side of the circuit board, the circuit board comprising a metal shielding layer on a second side of the circuit board that is opposite the first side.

Clause 6: The sensing instrument of any of Clauses 1-5, further comprising a spacer configured to maintain a minimum distance between (i) the first electrode or the second electrode and (ii) the material.

Clause 7: The sensing instrument of any of Clauses 1-6, further comprising: a third electrode; a fourth electrode that surrounds the third electrode; a fifth electrode; and a sixth electrode that surrounds the fifth electrode, wherein the first electrode, the third electrode, and the fifth electrode are collinear, and wherein the sensing module is further configured to: apply a second voltage between the third electrode and the fourth electrode while the third electrode and the fourth electrode are adjacent to the material, and apply a third voltage between the fifth electrode and the sixth electrode while the fifth electrode and the sixth electrode are adjacent to the material.

Clause 8: The sensing instrument of any of Clauses 1-6, further comprising: a third electrode; a fourth electrode that surrounds the third electrode; a fifth electrode; and a sixth electrode that surrounds the fifth electrode, wherein the first electrode, the third electrode, and the fifth electrode are not collinear, and wherein the sensing module is further configured to: apply a second voltage between the third electrode and the fourth electrode while the third electrode and the fourth electrode are adjacent to the material, and apply a third voltage between the fifth electrode and the sixth electrode while the fifth electrode and the sixth electrode are adjacent to the material.

Clause 9: A method of operating a sensing instrument, the method comprising: applying a voltage between a first electrode and a second electrode while the first electrode and the second electrode are positioned adjacent to a material, wherein the second electrode surrounds the first electrode; and sensing a capacitance of the material based on a response of the material to the voltage.

Clause 10: The method of Clause 9 wherein applying the voltage comprises applying the voltage while the first electrode and the second electrode are not in contact with the material.

Clause 11: The method of any of Clauses 9-10, wherein the voltage is an alternating current (AC) voltage.

Clause 12: The method of any of Clauses 9-11, wherein the voltage is a first voltage, the method further comprising applying a second voltage between the first electrode and a third electrode concurrently with applying the first voltage, wherein the second voltage is applied while the third electrode is positioned adjacent to the material, and wherein the third electrode surrounds the second electrode.

Clause 13: The method of Clause 12, wherein applying the second voltage comprises applying the second voltage to shape an electric field formed between the first electrode and the second electrode.

Clause 14: The method of any of Clauses 9-13, further comprising: determining that the capacitance of the material differs from a baseline capacitance by more than a threshold difference; and responsive to the determining, providing an indication via a user interface that an anomaly exists beneath the first electrode and the second electrode.

Clause 15: The method of any of Clauses 9-14, further comprising: sensing the capacitance of the material while moving the first electrode and the second electrode over the material to be adjacent to a second region of the material; and low-pass filtering the capacitance sensed while moving the first electrode and the second electrode.

Clause 16: A method of operating a sensing instrument, the method comprising: applying a first voltage between a first electrode and a second electrode while the first electrode and the second electrode are positioned adjacent to a first region of a material, wherein the second electrode surrounds the first electrode; sensing a first capacitance of the material based on a first response of the material to the first voltage; applying a second voltage between a third electrode and a fourth electrode while the third electrode and the fourth electrode are positioned adjacent to a second region of the material, wherein the fourth electrode surrounds the third electrode; sensing a second capacitance of the material based on a second response of the material to the second voltage; applying a third voltage between a fifth electrode and a sixth electrode while the fifth electrode and the sixth electrode are positioned adjacent to a third region of the material, wherein the sixth electrode surrounds the fifth electrode; and sensing a third capacitance of the material based on a third response of the material to the third voltage.

Clause 17: The method of Clause 16, further comprising: determining that the first capacitance of the material differs from a baseline capacitance by more than a threshold difference; responsive to the determining, determining a depth of an anomaly beneath the first electrode and the second electrode based on the first capacitance, the second capacitance, and the third capacitance; and providing an indication via a user interface of the depth of the anomaly beneath the first electrode and the second electrode.

Clause 18: The method of Clause 16, further comprising: determining that the first capacitance of the material differs from a baseline capacitance by more than a threshold difference; responsive to the determining, determining a size of an anomaly beneath the first electrode and the second electrode based on the first capacitance, the second capacitance, and the third capacitance; and providing an indication via a user interface of the size of the anomaly beneath the first electrode and the second electrode.

Clause 19: The method of any of Clauses 16-18, wherein the first electrode, the third electrode, and the fifth electrode are collinear, the method further comprising: applying a fourth voltage between the first electrode and the second electrode while the first electrode and the second electrode are positioned adjacent to a fourth region of the material; sensing a fourth capacitance of the material based on a fourth response of the material to the fourth voltage; applying a fifth voltage between the third electrode and the fourth electrode while the third electrode and the fourth electrode are positioned adjacent to a fifth region of the material; sensing a fifth capacitance of the material based on a fifth response of the material to the fifth voltage; applying a sixth voltage between the fifth electrode and the sixth electrode while the fifth electrode and the sixth electrode are positioned adjacent to a sixth region of the material; and sensing a sixth capacitance of the material based on a sixth response of the material to the sixth voltage.

Clause 20: The method of any of Clauses 16-18, wherein the first electrode, the third electrode, and the fifth electrode are not collinear.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A sensing instrument comprising:
   a first electrode;
   a second electrode that surrounds the first electrode;
   a third electrode;
   a fourth electrode that surrounds the third electrode;
   a fifth electrode;
   a sixth electrode that surrounds the fifth electrode; and
   a sensing module configured to perform functions comprising:
   applying a first voltage between the first electrode and the second electrode while the first electrode and the second electrode are positioned adjacent to a first region of a material;
   sensing a first capacitance of the material based on a first response of the material to the first voltage;
   applying a second voltage between the third electrode and the fourth electrode while the third electrode and the fourth electrode are positioned adjacent to a second region of the material;
   sensing a second capacitance of the material based on a second response of the material to the second voltage;
   applying a third voltage between the fifth electrode and the sixth electrode while the fifth electrode and the sixth electrode are positioned adjacent to a third region of the material;
   sensing a third capacitance of the material based on a third response of the material to the third voltage;
   determining that the first capacitance of the material differs from a baseline capacitance by more than a threshold difference;
   responsive to the determining, determining a size of an anomaly or a depth of the anomaly beneath the first electrode and the second electrode based on the first capacitance, the second capacitance, and the third capacitance; and
   providing an indication via a user interface of the size or the depth of the anomaly beneath the first electrode and the second electrode.

2. The sensing instrument of claim 1, wherein the first electrode is coplanar with the second electrode.

3. The sensing instrument of claim 1, wherein the first electrode and the second electrode together have reflectional symmetry.

4. The sensing instrument of claim 1, further comprising a seventh electrode that surrounds the first electrode.

5. The sensing instrument of claim 4, wherein the seventh electrode surrounds the second electrode.

6. The sensing instrument of claim 1, further comprising a circuit board, the first electrode and the second electrode being positioned on a first side of the circuit board.

7. The sensing instrument of claim 6, the circuit board comprising a metal shielding layer on a second side of the circuit board that is opposite the first side.

8. The sensing instrument of claim 1, further comprising a spacer configured to maintain a minimum distance between (i) the first electrode or the second electrode and (ii) the material.

9. The sensing instrument of claim 1,
   wherein the first electrode, the third electrode, and the fifth electrode are collinear.

10. The sensing instrument of claim 1, wherein the first electrode, the third electrode, and the fifth electrode are not collinear.

11. The sensing instrument of claim 1, wherein the first electrode and the second electrode together have rotational symmetry.

12. A method of operating a sensing instrument, the method comprising:
    applying a first voltage between a first electrode and a second electrode while the first electrode and the second electrode are positioned adjacent to a first region of a material, wherein the second electrode surrounds the first electrode;
    sensing a first capacitance of the material based on a first response of the material to the first voltage;
    applying a second voltage between a third electrode and a fourth electrode while the third electrode and the fourth electrode are positioned adjacent to a second region of the material, wherein the fourth electrode surrounds the third electrode;
    sensing a second capacitance of the material based on a second response of the material to the second voltage;
    applying a third voltage between a fifth electrode and a sixth electrode while the fifth electrode and the sixth electrode are positioned adjacent to a third region of the material, wherein the sixth electrode surrounds the fifth electrode;
    sensing a third capacitance of the material based on a third response of the material to the third voltage;
    determining that the first capacitance of the material differs from a baseline capacitance by more than a threshold difference;
    responsive to the determining, determining a size of an anomaly or a depth of the anomaly beneath the first electrode and the second electrode based on the first capacitance, the second capacitance, and the third capacitance; and providing an indication via a user interface of the size or the depth of the anomaly beneath the first electrode and the second electrode.

13. The method of claim 12, wherein applying the first voltage comprises applying the first voltage while the first electrode is not in contact with the material.

14. The method of claim 13, wherein applying the first voltage comprises applying the first voltage while the second electrode is not in contact with the material.

15. The method of claim 12, wherein the first voltage is an alternating current voltage.

16. The method of claim 12, further comprising applying a fourth voltage between the first electrode and a seventh electrode concurrently with applying the first voltage, wherein the fourth voltage is applied while the seventh electrode is positioned adjacent to the material, and wherein the seventh electrode surrounds the second electrode.

17. The method of claim 16, wherein applying the fourth voltage comprises applying the fourth voltage to shape an electric field formed between the first electrode and the second electrode.

18. The method of claim 12, wherein the first electrode, the third electrode, and the fifth electrode are collinear, the method further comprising:

applying a fourth voltage between the first electrode and the second electrode while the first electrode and the second electrode are positioned adjacent to a fourth region of the material;

sensing a fourth capacitance of the material based on a fourth response of the material to the fourth voltage;

applying a fifth voltage between the third electrode and the fourth electrode while the third electrode and the fourth electrode are positioned adjacent to a fifth region of the material;

sensing a fifth capacitance of the material based on a fifth response of the material to the fifth voltage;

applying a sixth voltage between the fifth electrode and the sixth electrode while the fifth electrode and the sixth electrode are positioned adjacent to a sixth region of the material; and sensing a sixth capacitance of the material based on a sixth response of the material to the sixth voltage.

19. The method of claim 12, wherein the first electrode, the third electrode, and the fifth electrode are not collinear.

20. The method of claim 12, wherein the first voltage is an alternating current voltage.

* * * * *